United States Patent
Takeda et al.

(10) Patent No.: US 11,973,716 B2
(45) Date of Patent: *Apr. 30, 2024

(54) TERMINAL, RADIO COMMUNICATION METHOD, BASE STATION, AND SYSTEM

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 17/464,072

(22) Filed: Sep. 1, 2021

(65) Prior Publication Data

US 2021/0399859 A1 Dec. 23, 2021

Related U.S. Application Data

(63) Continuation of application No. 16/086,767, filed as application No. PCT/JP2017/011099 on Mar. 21, 2017, now Pat. No. 11,139,938.

(30) Foreign Application Priority Data

Mar. 23, 2016 (JP) ................... 2016-059128

(51) Int. Cl.
*H04L 5/00* (2006.01)
*H04L 5/14* (2006.01)
(Continued)

(52) U.S. Cl.
CPC .......... *H04L 5/0053* (2013.01); *H04L 5/0048* (2013.01); *H04L 5/14* (2013.01); *H04W 72/04* (2013.01); *H04W 72/0446* (2013.01)

(58) Field of Classification Search
None
See application file for complete search history.

(56) References Cited

U.S. PATENT DOCUMENTS 5,874,517 A * 2/1999 Huang ................... C08K 5/005
528/271
9,686,064 B2 * 6/2017 He .......................... H04L 5/0055
(Continued)

FOREIGN PATENT DOCUMENTS

| WO | 2014/209959 A1 | 12/2014 |
| WO | 2016/013299 A1 | 1/2016 |
| WO | 2016037516 | 3/2016 |

OTHER PUBLICATIONS

3Gpp Ts 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
(Continued)

*Primary Examiner* — Faiyazkhan Ghafoerkhan
(74) *Attorney, Agent, or Firm* — Osha Bergman Watanabe & Burton LLP

(57) ABSTRACT

A terminal is disclosed that includes a processor that, in case where frequency division duplex (FDD) is applied, controls a transmission of an uplink (UL) signal, in FDD, at a same timing as a UL transmission timing that is applied in time division duplex (TDD). The terminal also includes a receiver that receives a downlink control information (DCI), and a physical downlink shared channel (PDSCH) scheduled by the DCI. The terminal also includes a transmitter that transmits a HARQ-ACK in response to the PDSCH. The reception of the DCI and the transmission of the HARQ-
(Continued)

ACK are allowed within one slot. In other aspects, a radio communication method, a base station, and a system are also disclosed.

5 Claims, 21 Drawing Sheets

(51) Int. Cl.
*H04W 72/04* (2023.01)
*H04W 72/0446* (2023.01)

(56) References Cited

U.S. PATENT DOCUMENTS

| | | | | |
|---|---|---|---|---|
| 9,860,914 | B2* | 1/2018 | Chen | H04W 72/23 |
| 9,900,142 | B2* | 2/2018 | Yi | H04L 5/0094 |
| 10,374,748 | B2* | 8/2019 | Oketani | H04W 72/04 |
| 10,694,539 | B2* | 6/2020 | Oh | H04L 5/0094 |
| 10,958,407 | B2* | 3/2021 | Lee | H04L 5/14 |
| 11,139,938 | B2* | 10/2021 | Takeda | H04L 5/143 |
| 2013/0343239 | A1* | 12/2013 | Damnjanovic | H04W 72/23 370/280 |
| 2014/0003392 | A1* | 1/2014 | Yang | H04W 36/00692 370/331 |
| 2014/0029484 | A1* | 1/2014 | Choi | H04L 5/1469 370/280 |
| 2015/0215095 | A1* | 7/2015 | Ahn | H04L 5/14 370/280 |
| 2015/0230268 | A1* | 8/2015 | Chen | H04W 56/0005 370/280 |
| 2015/0305000 | A1* | 10/2015 | Nguyen | H04L 1/1822 370/329 |
| 2016/0212734 | A1* | 7/2016 | He | H04L 5/14 |
| 2017/0310435 | A1* | 10/2017 | Wei | H04L 5/0044 |
| 2018/0359075 | A1* | 12/2018 | Lee | H04L 1/1864 |
| 2019/0089506 | A1* | 3/2019 | Takeda | H04L 5/0091 |
| 2021/0399859 | A1* | 12/2021 | Takeda | H04L 5/1469 |

OTHER PUBLICATIONS

International Search Report issued in PCT/JP2017/011099 dated Jun. 6, 2017 (1 page).
Written Opinion issued in PCT/JP2017/011099 dated Jun. 6, 2017 (4 pages).
Office Action issued in the counterpart European Patent Application No. 17770189.3, dated Oct. 24, 2019 (20 pages).
Extended European Search Report in counterpart European Application No. 17770189.3 dated Mar. 12, 2020 (22 pages).
Ericsson; "Physical layer timing for MTC"; 3GPP TSG RAN WG1 Meeting #82, R1-153724; Beijing, China; Aug. 24-28, 2015 (4 pages).
Fujitsu; "On scenarios for cross-subframe/multi-subframe scheduling"; 3GPP TSG RAN WG1 Meeting #73, R1-131952; Fukuoka, Japan; May 20-24, 2013 (2 pages).
Alcatel-Lucent Shanghai Bell et al.; "Overview of Specification Impact for TTI Shortening"; 3GPP TSG RAN WG1 Meeting #83, R1-156721; Anaheim, U.S.; Nov. 15-22, 2014 (3 pages).
Office Action issued in the counterpart Japanese Patent Application No. 2018-507320, dated Dec. 8, 2020 (6 pages).
Office Action issued in the counterpart Japanese Patent Application No. 2018-507320, dated Feb. 24, 2021 (8 pages).
NTT Docomo, Inc.; "5G Vision for 2020 and Beyond"; 3GPP RAN workshop on 5G, RWS-150051; Phoenix, AZ, USA; Sep. 17-18, 2015 (23 pages).
Office Action issued in counterpart European Application No. 17770189.3 dated Oct. 8, 2021 (8 pages).

* cited by examiner

TERMINAL, RADIO COMMUNICATION METHOD, BASE STATION, AND SYSTEM

CROSS-REFERENCE TO RELATED APPLICATIONS

This application is a continuation application of U.S. patent application Ser. No. 16/086,767, filed on Sep. 20, 2018, which is a national phase application of PCT/JP2017/011099, filed on Mar. 21, 2017, which claims priority to Japanese Patent Application No. 2016-059128, filed on Mar. 23, 2016. The contents of these applications are hereby incorporated by reference in their entirety.

TECHNICAL FIELD

The present invention relates to a a terminal, a radio communication method, a base station, and a system in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "5G (5th generation mobile communication system)," "5G+(5G plus)," "New-RAT (Radio Access Technology)" and so on) are also under study for the purpose of achieving further broadbandization and increased speed beyond LTE.

Existing LTE systems use control based on TDD (Time Division Duplex) and FDD (Frequency Division Duplex). For example, in TDD, whether each subframe in a radio frame is used in the uplink ("UL") or in the downlink ("DL") is determined strictly based on UL/DL configurations.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Now, for future radio communication systems such as LTE Rel. 13 and later versions (for example, 5G), radio frames (also referred to as "lean radio frames") to provide good future scalability and excellent power saving performance are under study. Lean radio frames are based on the assumption of using subframes with no predetermined use (for example, the direction in communication such as DL or UL, the type and format of signals such as data, reference signals, sounding and feedback information, and so on), except for some subframes (dynamic subframe utilization).

A study is in progress to design future radio communication systems that employ dynamic subframe utilization, based on time division duplex (TDD), which switches between DL communication and UL communication in the same frequency band, over time. Meanwhile, future radio communication systems are also expected to support frequency division duplex (FDD), in which DL communication and UL communication are performed in different frequency bands.

However, if the FDD communication scheme in existing LTE systems is applied to TDD-based future radio communication systems on an as-is basis, there is a fear that dynamic subframe utilization offers only limited advantages.

The present invention has been made in view of the above, and it is therefore an object of the present invention to provide a user terminal, a radio base station and a radio communication method, whereby, even when FDD is used in future radio communication systems, the advantages of dynamic subframe utilization can be achieved.

Solution to Problem

According to one aspect of the present invention, a user terminal has a receiving section that receives a downlink (DL) signal, a transmission section that transmits an uplink (UL) signal, and a control section that controls the receipt of the DL signal and/or the transmission of the UL signal in frequency division duplex (FDD), which use different frequencies, to the same timing as the receipt of the DL signal and/or the transmission of the UL signal in time division duplex (TDD), which use the same frequency.

Advantageous Effects of Invention

According to the present invention, it is possible to achieve the advantages of dynamic subframe utilization even when FDD is used in future radio communication systems.

DESCRIPTION OF EMBODIMENTS

Figure 1:
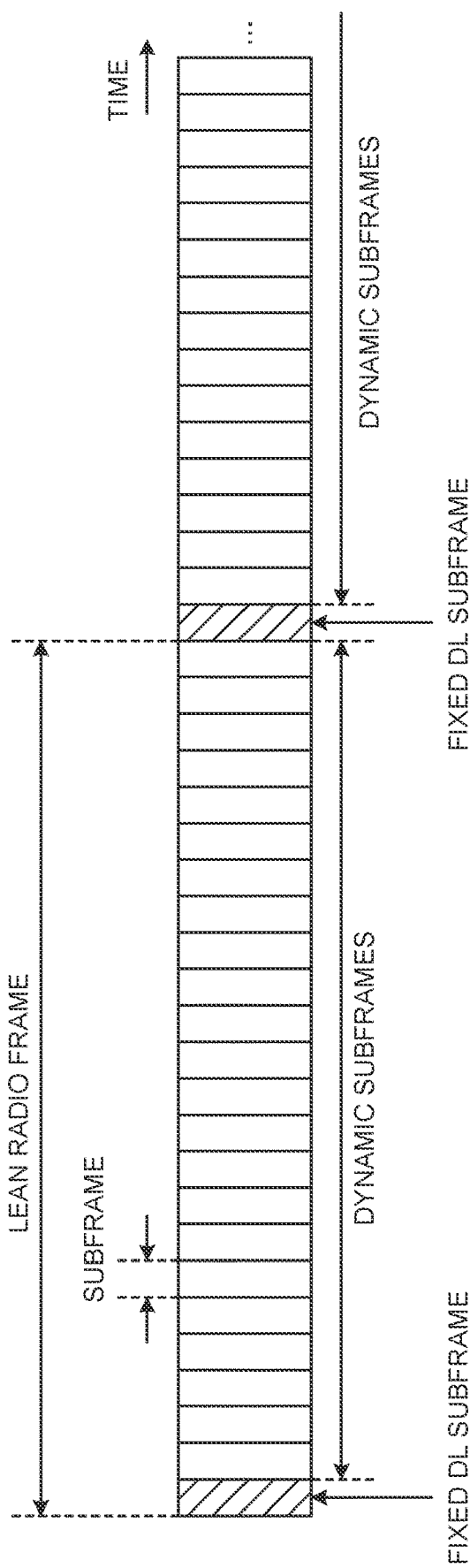
FIG. 1 is a diagram to show an example of the format of lean radio frames.

An example of a communication method to use lean radio frames (for example, 5G), for future radio communication systems such as LTE Rel. 13 and later versions, will be described below with reference to FIG. 1 and FIG. 2. FIG. 1 is a diagram to show an example of the format of lean radio frames. As shown in FIG. 1, lean radio frames have a predetermined time duration (for example, five to forty ms). A lean radio frame is comprised of a plurality of subframes, where each subframe has a predetermined time duration (for example, 0.125 ms, 0.25 ms, 1 ms, etc.).

Subframes in lean radio frames have a shorter time duration than the subframes of existing LTE systems (LTE Rel. 8 to 12). As a result of this, subframes in lean radio frames can be transmitted and received in a short time, compared to existing LTE systems.

Lean radio frames are comprised of subframes with a predetermined use (also referred to as "fixed subframes") and subframes with no predetermined use (also referred to as "dynamic subframes," "flexible subframes," "dynamically utilized subframes" and so on).

In a lean radio frame, the timing of a fixed subframe may be determined in advance (for example, subframe #0, subframe #5, etc.), or may be configured via higher layer signaling such as RRC (Radio Resource Control) signaling, or via broadcast signaling. Furthermore, fixed subframes may be provided in varying timings, on a per cell basis (that is, the offset value may be determined per cell). For example, referring to FIG. 1, fixed subframes (fixed DL subframes), which are configured in advance as DL subframes, are provided in a predetermined cycle (which is, for example, five ms or more).

Note that multiple fixed DL subframes may be configured in a lean radio frame. In this case, fixed DL subframes may be mapped so as to concentrate at a specific time within a lean radio frame (for example, in a specific period of two ms within a cycle of ten ms), so that it is possible to make the cycle of fixed DL subframes longer, and reduce energy consumption in, for example, radio base stations and user terminals that perform transmission/receipt using fixed DL subframes.

Meanwhile, by mapping fixed DL subframes so as to be distributed within a lean radio frame, it is possible to make the cycle of fixed DL subframes shorter, which can, for example, make it easier to build quality connections with user terminals that move at high speeds. The locations and the cycle of time resources for fixed DL subframes may be selected by a radio base station from a plurality of combinations that are prepared in advance, and a possible combination may be detected by a user terminal on a blind basis, or the locations and the cycle of time resources for fixed DL subframes may be reported from the radio base station to the user terminal via broadcast signals, RRC signaling and so on.

Also, although not shown in the drawings, fixed subframes (fixed UL subframes) that are configured in advance as UL subframes may be provided in lean radio frames. In these fixed UL subframes, resources for the signals (for example, random access preambles) for initial access (standalone operation) to cells using lean radio frames may be reserved.

Also, the use of dynamic subframes may be designated by a DL control signal (also referred to as a "DL control channel," an "L1/L2 control signal," an "L1/L2 control channel" and so on) in each dynamic subframe (dynamic assignment), or may be designated by fixed DL subframes (semi-dynamic assignment). Thus, when dynamic subframe utilization is employed, the use of subframes may be specified dynamically on a per subframe basis, or may be specified semi-dynamically for every predetermined number of subframes (for example, every multiple dynamic subframes between fixed DL subframes).

Figure 2:
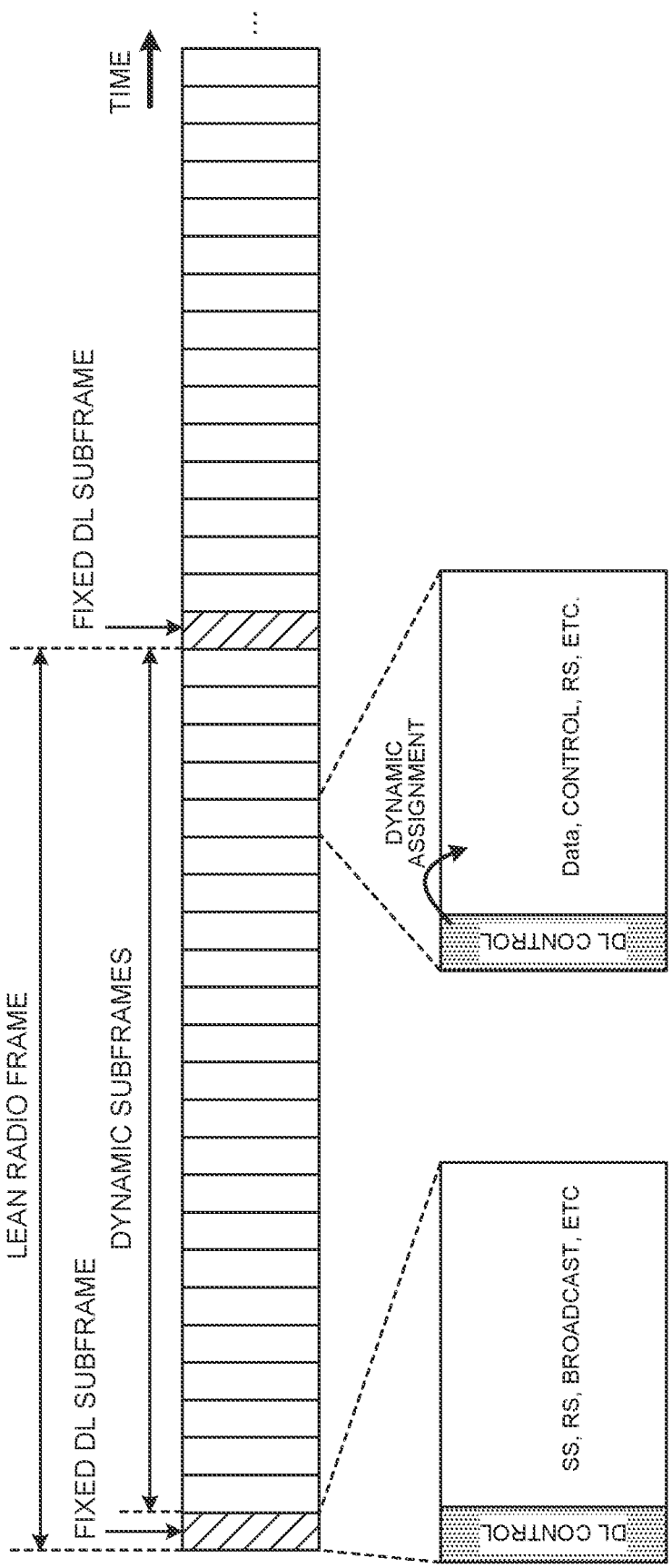
FIG. 2 is a diagram to show an example of the format of lean radio frames.

FIG. 2 is a diagram to show examples of the formats of fixed DL subframes and dynamic subframes. Note that the formats of fixed DL subframes and dynamic subframes shown in FIG. 2 are simply examples, and those shown in FIG. 2 are by no means limiting.

As shown in FIG. 2, fixed DL subframes are used to transmit signals for cell discovery (detection), synchronization, measurements (for example, RRM (Radio Resource Management) measurements including RSRP (Reference Signal Received Power) measurements), mobility control, initial access control, and so on.

The signals to be transmitted in fixed DL subframe may be, for example, at least one of a detection signal, a detection measurement signal, a measurement signal, a mobility measurement signal, a discovery reference signal (DRS), a discovery signal (DS), synchronization signals (PSS (Primary Synchronization Signal) and/or SSS (Secondary Synchronization Signal)), a broadcast signal (broadcast information (MIB (Master Information Block) and/or system information (SIBs (System Information Blocks)) and a channel state information reference signal (CSI-RS).

Also, the signals to be transmitted in fixed DL subframes may be designated by the DL control signals of the fixed DL subframes, may be determined in advance, or may be configured via RRC signaling. If the signals to be transmitted in fixed DL subframe are designated by DL control signals, a radio base station can command a user terminal to receive DL data, DL sounding RSs and so on, in fixed DL subframes (scheduling).

Here, when DL control signals of different roles are multiplexed over the same DL control channel, for example, different IDs (RNTIs and/or the like) can be applied to the DL control signals of respective roles to mask the CRC (Cyclic Redundancy Check). In this case, in fixed DL subframes, the information to be reported in common to a plurality of user terminals (for example, a broadcast signal or a broadcast-based signal) can be scheduled, information about the subframe format of dynamic subframes (for example, information about the direction of communication in the data channel) can be reported, and DL data and the DL sounding RS can be transmitted and scheduled using resources that are left after reporting information about the position of the fixed UL subframe, and so on.

On the other hand, the dynamic subframes can be used to transmit the signals designated by the DL control signals of the dynamic subframes (or the fixed DL subframes), such as DL and/or UL (hereinafter referred to as "DL/UL") data, DL/UL sounding, feedback signals in response to uplink control information (UCI), random access preambles, and so on.

Furthermore, in dynamic subframes, assignment may be performed so that transmission/receipt control (scheduling) is completed within dynamic subframes, in order to enable short-time communication. This type of assignment is also referred to as "self-contained assignment." Subframes, in which self-contained assignment is performed, may be referred to as "self-containment subframes." Self-contained subframes may be referred to as "self-contained TTIs" or "self-contained symbol sets," or other names may be applied as well.

Furthermore, in FIG. 2, the DL control signals are time-division-multiplexed (TDM: Time Division Multiplexing) with other signals (for example, with a data signal and other signals), but this is by no means limiting. The DL control signals may be time-division-multiplexed (TDM) and/or frequency-division-multiplexed (FDM: Frequency Division Multiplexing) with other signals, or may be embedded in data signals (or placed in some of the resource elements (RE) of the symbols assigned to the data signals).

A study is in progress to design future radio communication systems that employ the above-described dynamic subframe utilization based on TDD. With reference to FIGS. 3A, 3B, 4A, 4B, 5A, 5B, and 5C, examples of communication using TDD-based dynamic subframes will be described.

Figure 3A:
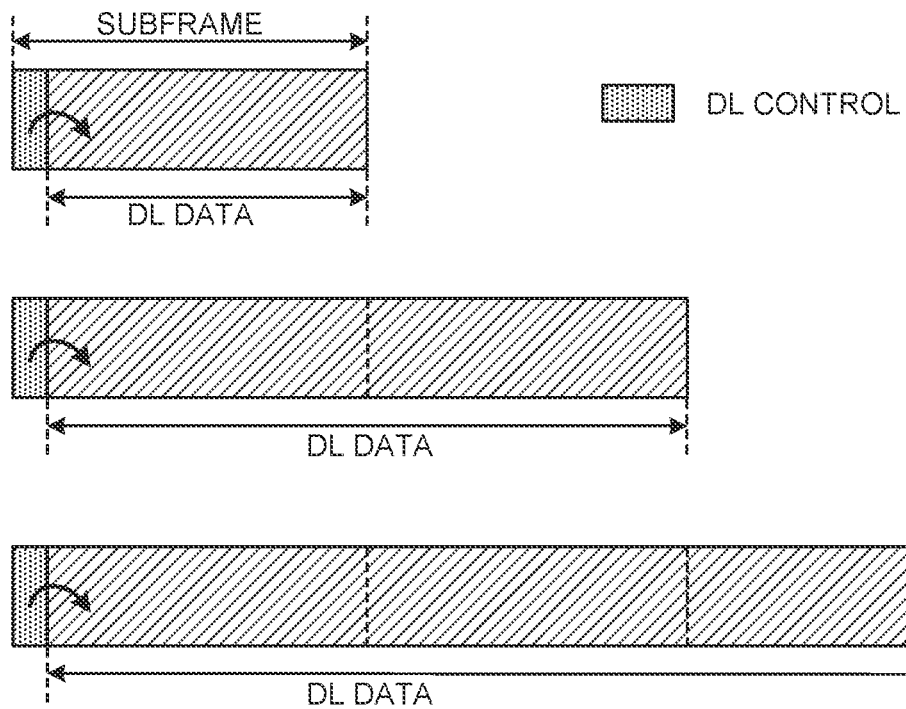
FIGS. 3A and 3B are diagrams to show examples of DL communication control in TDD.
Figure 3B:
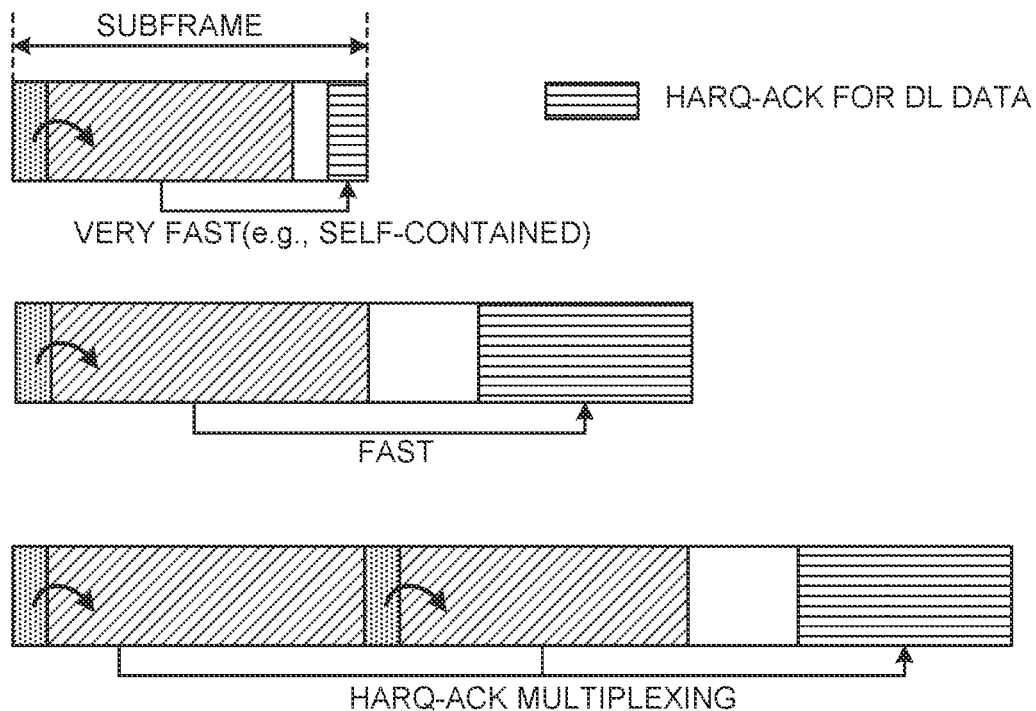

FIGS. 3A and 3B provide diagrams to show examples of DL communication control in TDD. As shown in FIG. 3A, a DL control signal (for example, a DL assignment) assigns (schedules) DL data signals in the same subframe as that of the DL control signal, or in a plurality of subframes after that subframe.

In FIG. 3A, the number of subframes (also referred to as "TTI duration") in which DL data signals are assigned may be indicated explicitly by the DL control signal, may be indicated implicitly by at least one of the transport block size, the number of resource blocks (PRBs: Physical Resource Blocks) assigned to the DL data signals, and so on.

Furthermore, as shown in FIG. 3B, a feedback signal (for example, an HARQ-ACK: (Hybrid Automatic Repeat reQuest-Acknowledgment), etc.) in response to a DL data signal may be transmitted in the same subframe as that of the DL data signal, or may be transmitted in a subsequent subframe. As shown in the bottom diagram in FIG. 3B, a feedback signal in response to the DL data signals of a plurality of different subframes may be multiplexed.

As shown in the top diagram in FIG. 3B, when a DL control signal that assigns a DL data signal, this DL data signal and a feedback signal in response to this DL data signal are included in the same subframe (self-contained subframe), it is possible to realize feedback with ultra-low delay of one ms or less, for example, so that the latency can be reduced.

Figure 4A:
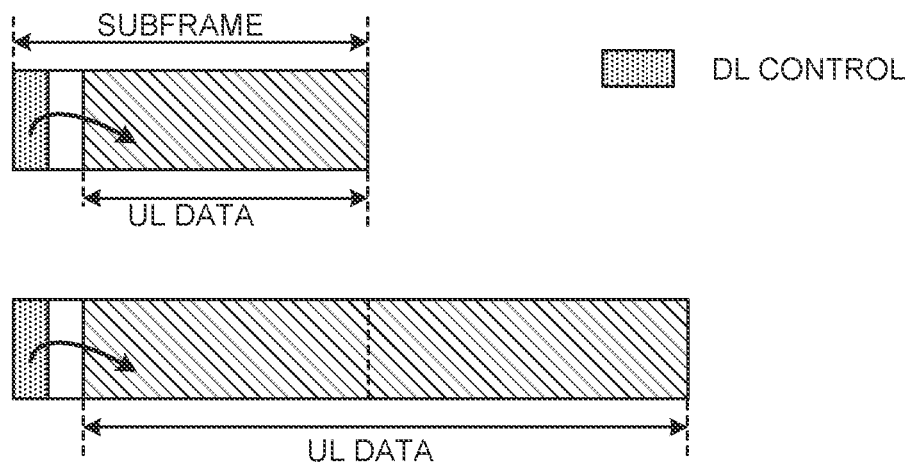
FIGS. 4A and 4B are diagrams to show examples of UL communication control in TDD.
Figure 4B:
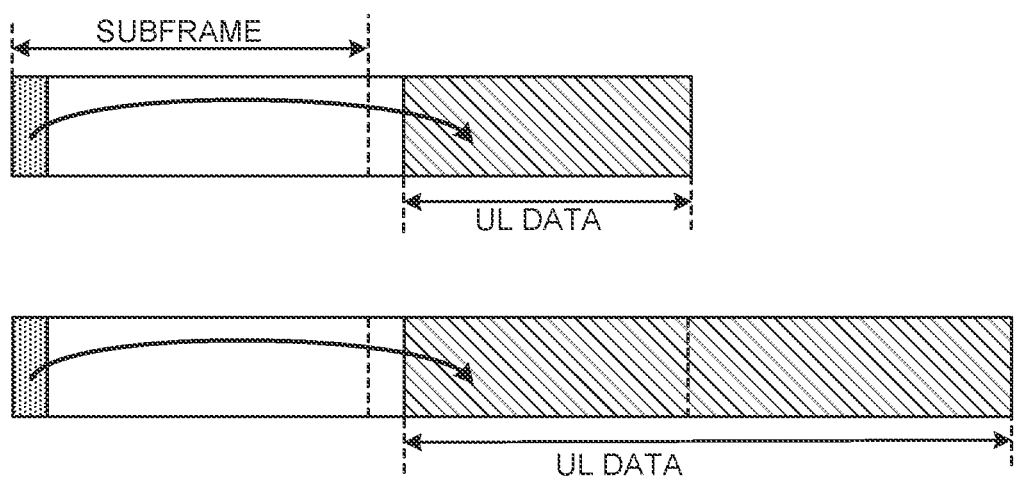

FIGS. 4A and 4B provide diagrams to show examples of UL communication control in TDD. As shown in FIG. 4A, a DL control signal (for example, a UL grant) may assign (schedule) a UL data signal in the same subframe as that of the DL control signal, or in a plurality of subframes after that subframe.

Alternatively, as shown in FIG. 4B, a DL control signal (for example, a UL grant) may assign (schedule) a UL data signal in at least one subframe after the same subframe of this DL control signal. For example, in FIG. 4B, a UL data signal is assigned in the next and a later subframe of the subframe of the DL control signal.

In FIGS. 4A and 4B, the number of subframes (also referred to as the "TTI duration") in which UL data signals are assigned may be indicated explicitly by the DL control signal, or may be indicated implicitly based on at least one of the transport block size, the number of PRBs assigned to the UL data signals, and so on.

Also, although not shown in the drawings, a feedback signal (for example, an HARQ-ACK, etc.) in response to a UL data signal may be transmitted in the same subframe as that of the UL data signal, or may be transmitted in a subsequent subframe. Furthermore, feedback signals in response to the UL data signals in a plurality of different subframes may be multiplexed.

Figure 5A:
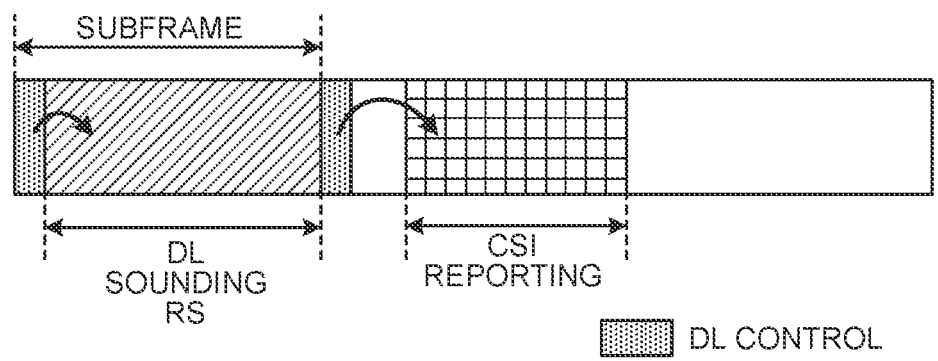
FIGS. 5A to 5C are diagrams to show examples of sounding control in TDD.
Figure 5B:
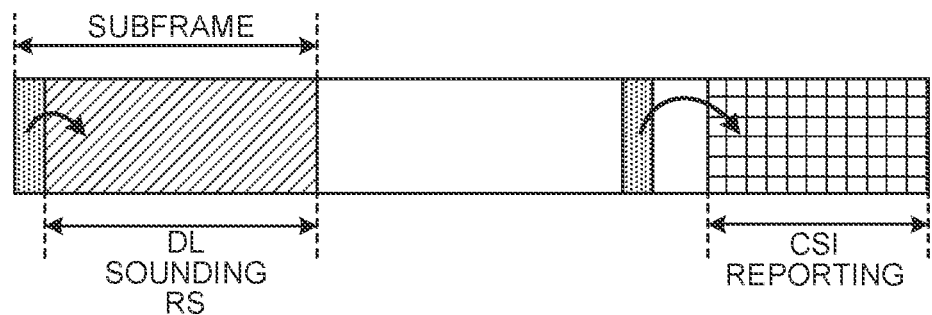
Figure 5C:
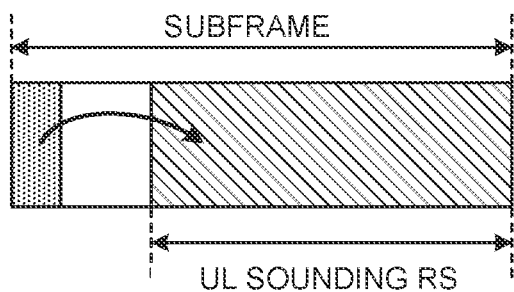

FIGS. 5A, 5B, and 5C provide diagrams to show examples of sounding control in TDD. FIGS. 5A and 5B show examples of measuring and reporting DL channel states using a DL sounding reference signal (RS). The DL sounding RS is a signal for measuring DL channel states, and may be referred to as the "CSI-RS," and/or the like.

As shown in FIGS. 5A and 5B, a DL control signal may assign (schedule) the DL sounding RS in the same subframe as that of the DL control signal. In FIGS. 5A and 5B, CSI that is measured based on this DL sounding RS is fed back using resources specified by a DL control signal that is different from the above DL control signal for assigning the DL sounding RS.

Note that the DL sounding RS may be assigned by a DL control signal (for example, a DL assignment) that assigns a DL data signal. In this case, the DL sounding RS and the DL data signal can be multiplexed in the same subframe. Alternatively, the DL sounding RS may be assigned by a DL control signal for DL sounding.

Furthermore, although not shown in the drawings, the above DL control signal for assigning the DL sounding RS may specify the resources for feeding back the CSI measured based on this DL sounding RS. In this case, the CSI above may be fed back in the same subframe as that of the DL sounding RS, or in a subsequent subframe.

FIG. 5C shows an example of measuring UL channel states using a UL sounding RS. The UL sounding RS is a signal for measuring UL channel states, and may be referred to as the "sounding reference signal (SRS)" and/or the like.

As shown in FIG. 5C, a DL control signal may assign (schedule) the UL sounding RS in the same subframe as that of the DL control signal. Since CSI measurements using the UL sounding RS takes place in the radio base station, CSI feedback from the user terminal is not necessary in the UL.

Note that the UL sounding RS may be assigned by a DL control signal (for example, a UL grant) that assigns a UL data signal. In this case, the UL sounding RS and the UL data signal can be multiplexed in the same subframe. Alternatively, the UL sounding RS may be assigned by a DL control signal for UL sounding.

Thus, studies are in progress to design future radio communication systems that adopt dynamic subframe utilization, based on TDD. Meanwhile, future radio communication systems are also expected to support FDD. However, if the FDD communication scheme in existing LTE systems is applied to TDD-based future radio communication systems on an as-is basis, there is a fear that dynamic subframe utilization offers only limited advantages.

So, the present inventors have studied ways to achieve the advantages of TDD-based dynamic subframe utilization even when FDD is used in future radio communication systems, and arrived at the present invention. To be more specific, the present inventors have come up with the idea of controlling the transmission of DL signals and/or the receipt of UL signals in FDD, which use different frequencies, to the same timing as the transmission of DL signals and/or the receipt of UL signals in TDD, which use the same frequency, as one aspect of the present invention.

Now, the radio communication method according to one embodiment of the present invention will be described below. Note that, in the present embodiment, subframes may be one ms, which is the same as in existing LTE systems, or may be shorter than one ms, longer than one ms, and so on. Furthermore, the duration of each symbol in subframes may have the same as in existing LTE systems, may be shorter than in existing LTE systems, or may be longer than in existing LTE systems. Furthermore, the number of symbols in a subframe may be the same as or different from that in existing LTE systems.

Furthermore, a subframe may be referred to as a "transmission time interval (TTI)." A subframe (one ms), if shorter than one ms, may be referred to as a "short subframe," "short TTI," and so on. Meanwhile, a subframe from existing LTE systems is also referred to as an "LTE subframe," a "normal TTI," a "long TTI," and so on.

Furthermore, the DL communication control and/or UL communication control according to the present embodiment may be applied to the above-described dynamic subframes in lean radio frames. That is to say, subframes in the following description may refer to the above-described dynamic subframes in lean radio frames, or may be fixed DL subframes. Furthermore, the UL/DL data in the drawings described below may include UL/DL sounding reference signals.

(First Aspect)

Based on a first aspect of the present invention, DL communication control will be described. According to the first aspect, even in FDD in which DL communication and UL communication are performed using different frequencies, control that relates to DL communication (for example, DL scheduling) is exerted in the same timing as in TDD in which DL communication and UL communication are switched over time in the same frequency.

To be more specific, according to the first aspect, a feedback signal (for example, an HARQ-ACK) in response to a DL data signal is transmitted at the same timing as a TDD feedback signal, which is transmitted using the same frequency as that of the DL data signal, by using a different frequency from that of the DL data signal.

Figure 6A:
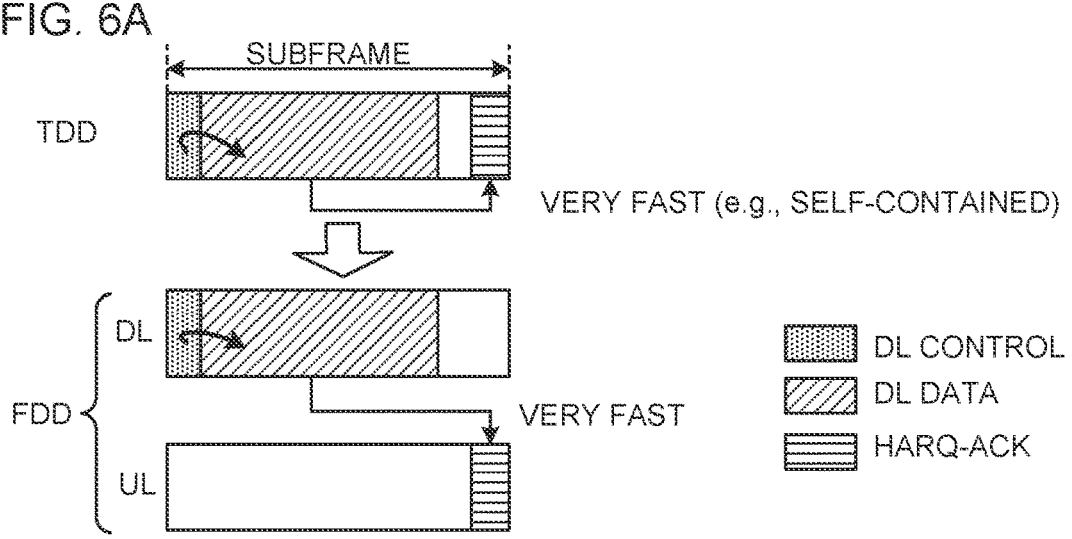
FIGS. 6A to 6C are diagrams to show examples of DL communication control according to a first aspect of the present invention.
Figure 6B:
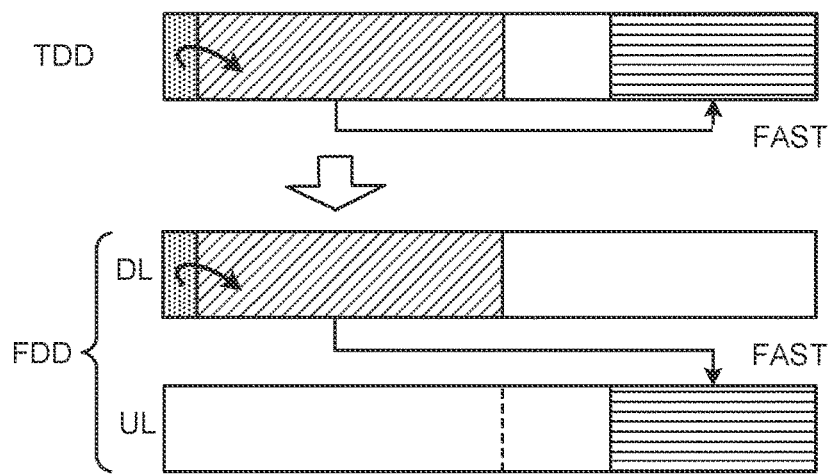
Figure 6C:
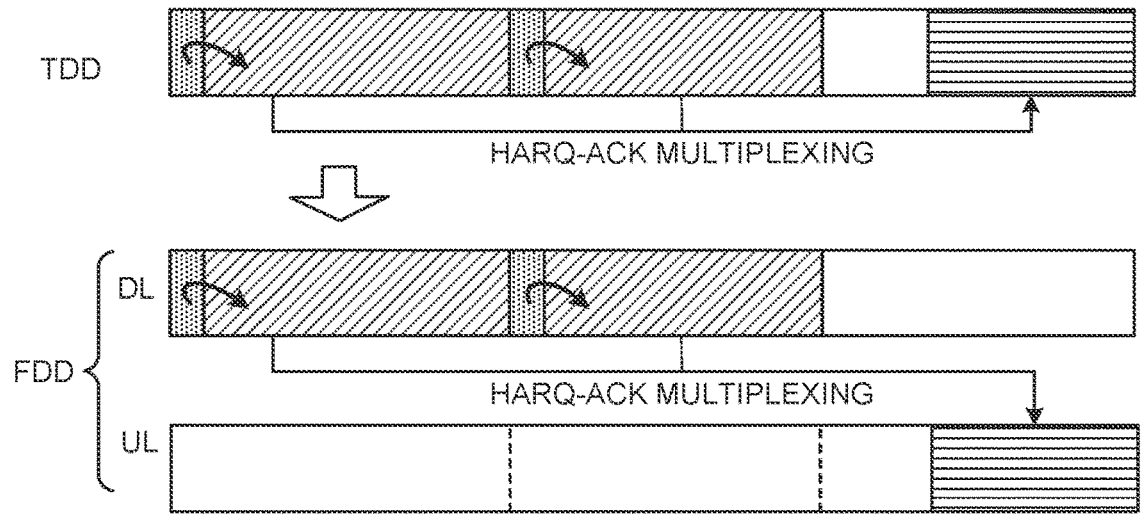

FIGS. 6A, 6B, and 6C provide diagrams to show examples of DL communication control according to the first aspect. As shown in FIGS. 6A, 6B, and 6C, in TDD, DL communication and UL communication are switched over time in the same frequency band. Meanwhile, in FDD, DL communication and UL communication are performed in different frequency bands.

As shown in FIG. 6A, when FDD is used, in a given subframe, the user terminal receives a DL control signal using the frequency for DL (first frequency) (hereinafter referred to as the "DL frequency"), and receives a DL data signal assigned in the same subframe as that of the DL control signal.

The user terminal transmits a feedback signal in response to the DL data signal in the same timing as that of a feedback signal in TDD, by using the frequency for UL (second frequency) (hereinafter referred to as the "UL frequency"). Here, the feedback signal may be transmitted in the same subframe as that of the DL data signal (FIG. 6A), or may be transmitted in a subsequent subframe (FIG. 6B).

Also, referring to FIGS. 6A and 6B, when TDD is used, a guard period is provided between the DL period in which the DL control signal and the DL data signal are received, and the UL period in which the feedback signal is transmitted. When FDD is used, the feedback signal is transmitted after the guard period, using the UL frequency.

Note that, in FIGS. 6A and 6B, a DL control signal that is transmitted in the DL frequency may assign DL data signals over a plurality of subframes (see FIG. 3A). The number of subframes (also referred to as "TTI duration") where DL data signals are assigned may be indicated explicitly by the DL control signal, or may be indicated implicitly by at least one of the transport block size, the number of PRBs assigned to the DL data signals, and so on.

Also, as shown in FIG. 6C, when the user terminal receives a plurality of DL data signals, assigned by DL control signals in a plurality of subframes, respectively, in the DL frequency, the user terminal may multiplex the feedback signals in response to these multiple DL data signals over the same subframe, and transmit this in the UL frequency.

Figure 7A:
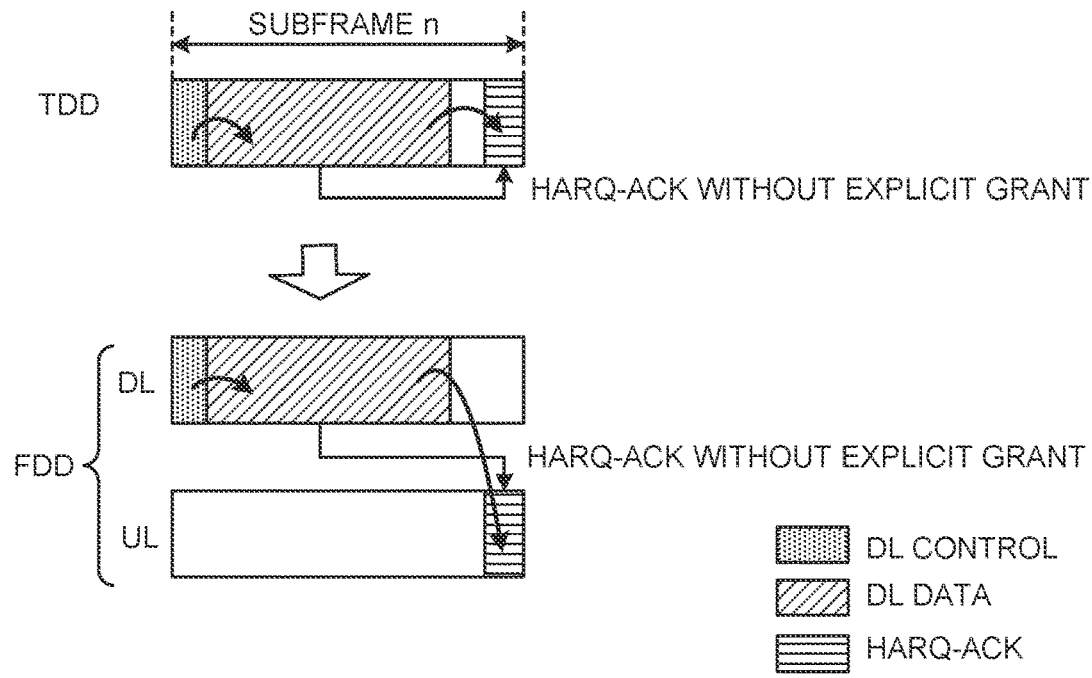
FIGS. 7A and 7B are diagrams to show examples of signal feedback control according to a first aspect of the present invention.
Figure 7B:
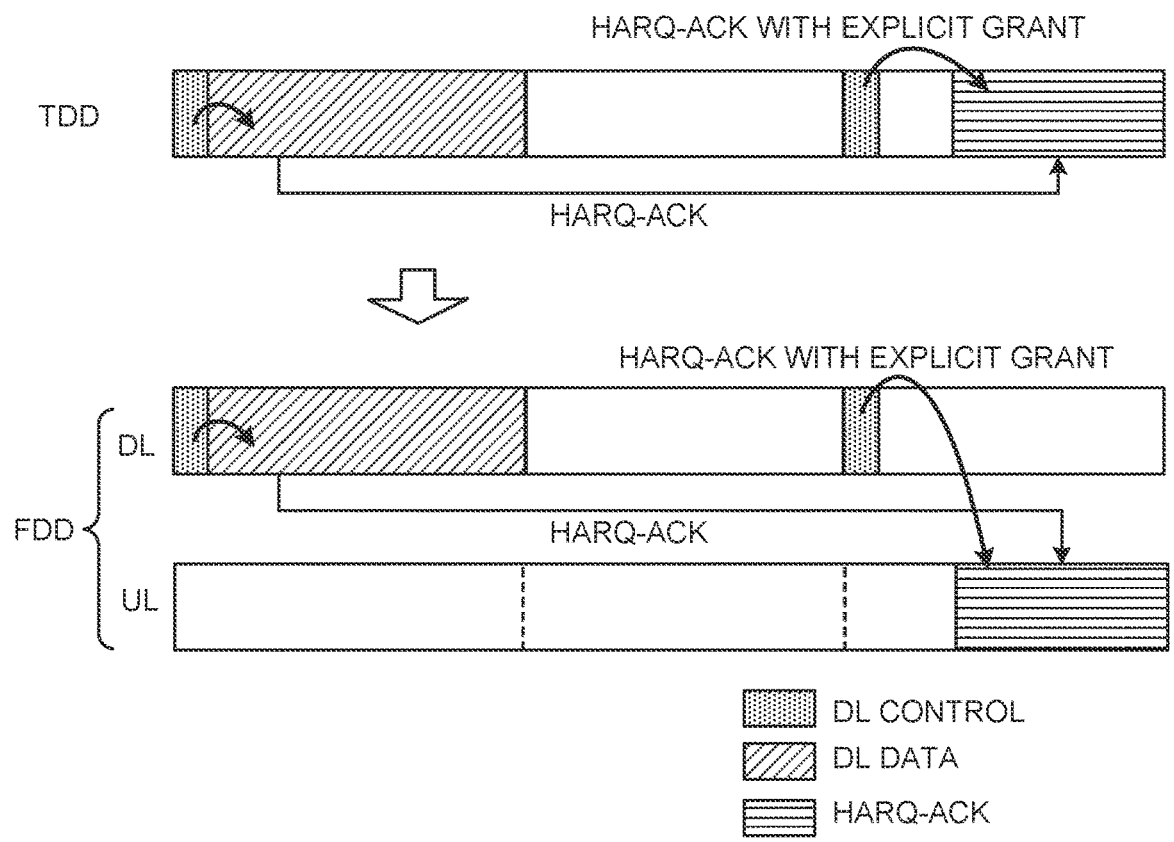

FIGS. 7A and 7B provide diagrams to show examples of feedback signal control according to the first aspect. In TDD, a feedback signal in response to a DL data signal may be transmitted (implicitly) without explicit assignment (grant), or may be transmitted based on explicit assignment.

As shown in FIG. 7A, when FDD is used, the user terminal may transmit a feedback signal in response to a DL data signal, received via a DL frequency in a given subframe, by using UL-frequency feedback resources that are implicitly assigned. The feedback resources may be determined based on, for example, the control channel elements (CCEs) that constitute the DL control signal. Note that these feedback resources may be provided in the same subframe as that of the DL data signal, or may be provided in a subsequent subframe.

As shown in FIG. 7B, in an FDD-based dynamic subframe, the user terminal may transmit a feedback signal in response to a DL data signal, received via a DL frequency, by using UL-frequency feedback resources that are assigned explicitly. In FIG. 7B, for example, feedback resources are assigned by a DL control signal. Note that this DL control signal may be a UL grant for assigning a UL data signal. Furthermore, in FIG. 7B, this DL control signal is transmitted two subframes after a DL data signal, but this is by no means limiting, and the DL control signal may be transmitted in any subframe after the DL data signal.

As described above, according to the first aspect of the present invention, even when FDD is used, DL communication (for example, receipt of DL data signals, transmission of feedback signals, etc.) is controlled in the same timing as in TDD. Therefore, even when FDD is used in future radio communication systems, it is possible to achieve the advantages of dynamic subframe utilization. Also, even when the user terminal to communicate in this FDD carrier is not capable of full-duplex (which is simultaneous DL receipt and UL transmission) (that is, when the user terminal is only capable of half-duplex), dynamic subframes can be employed by applying the same control as in TDD, so that it is not necessary to apply a plurality of different kinds of scheduling control depending on the user terminal's capabilities, and it is possible to simplify the implementation of the scheduler in the base station.

(Second Aspect)

Based on a second aspect of the present invention, UL communication control will be described. According to the second aspect, even in FDD, in which DL communication and UL communication are performed using different frequencies, control that relates to UL communication (such as UL scheduling) is exerted in the same timing as in TDD, in which DL communication and UL communication are switched over time in the same frequency.

To be more specific, in the second aspect, a UL data signal that is scheduled by a DL control signal is transmitted in the same timing as a UL data signal in TDD, which is transmitted using the same frequency as this DL control signal, by using a different frequency from that of this DL signal.

Figure 8A:
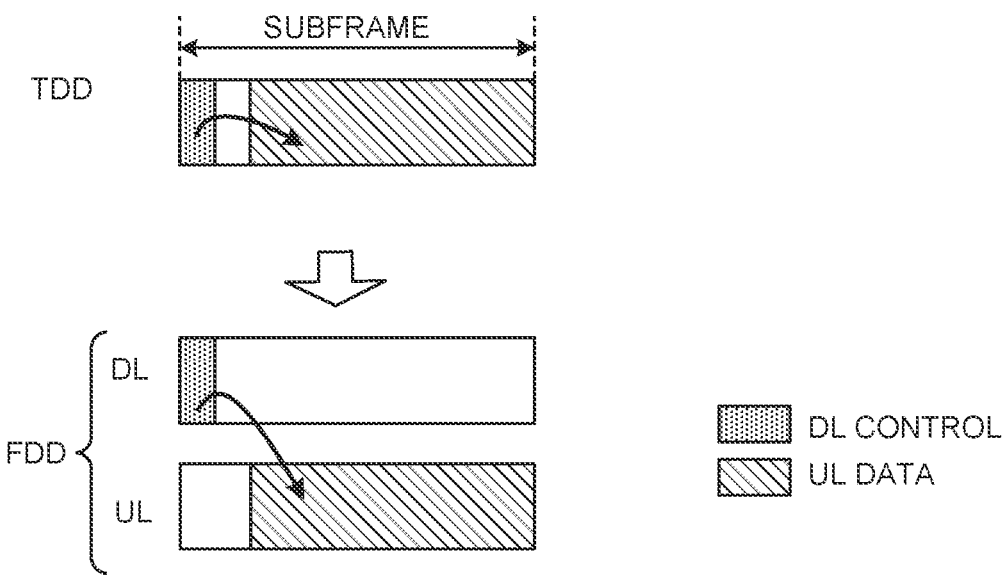
FIGS. 8A and 8B are diagrams to show examples of UL communication control according to the second aspect.
Figure 8B:
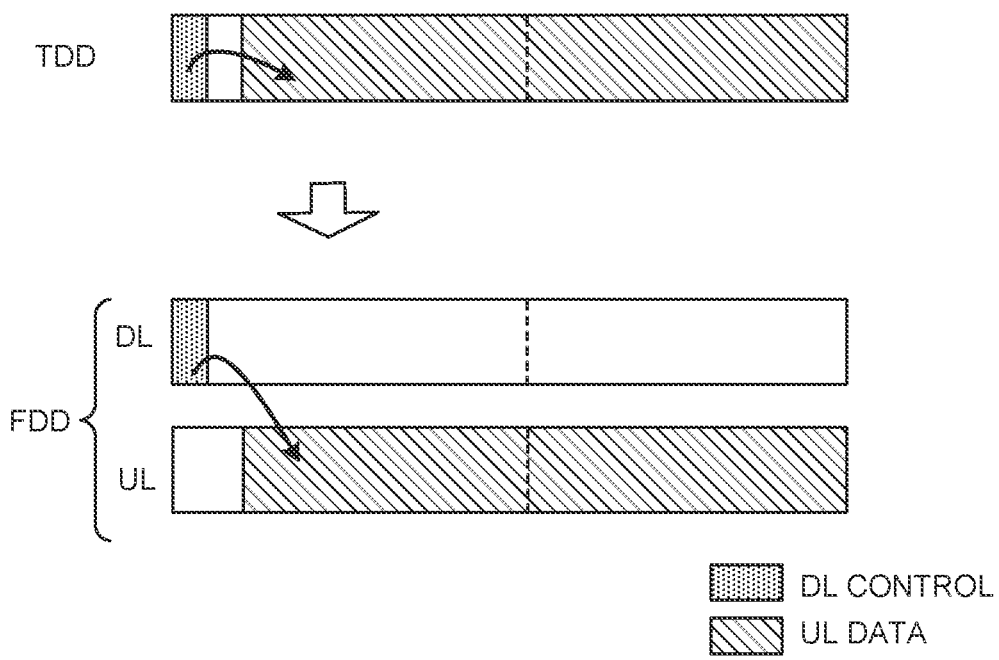

FIGS. 8A and 8B provide diagrams to show examples of UL communication control according to the second aspect. As shown in FIGS. 8A and 8B, when FDD is used, in a given subframe, the user terminal receives a DL control signal (for example, a UL grant) via a DL frequency. Based on the scheduling (assignment) information contained in this DL control signal, the user terminal may transmit a UL data signal, in the subframe containing this DL control signal or in a later subframe, using a UL frequency.

For example, the user terminal may transmit a UL data signal in the same subframe as that of the DL control signal, as shown in FIG. 8A, or transmit UL data signals in a plurality of subframes after this subframe, as shown in FIG. 8B.

Also, referring to FIGS. 8A and 8B, when TDD is used, a guard period is provided between the DL period in which the DL control signal is received and the UL period in which the UL data signal is transmitted. When FDD is used, the UL data signal is transmitted after the guard period, using the UL frequency.

Figure 9A:
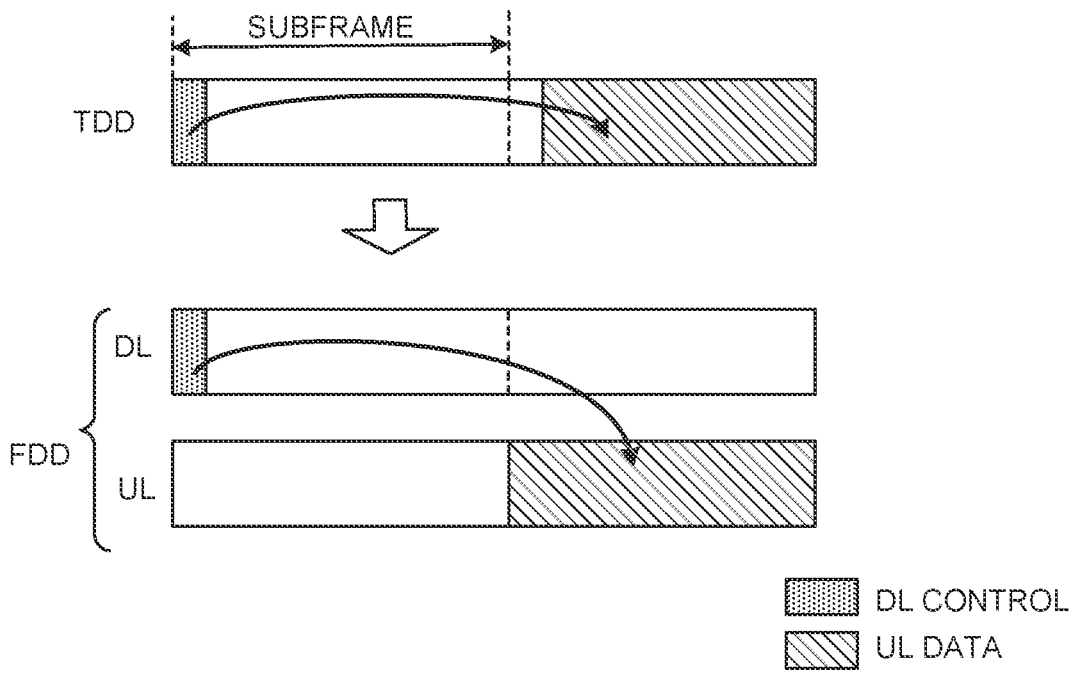
FIGS. 9A and 9B are diagrams to show other examples of UL communication control according to the second aspect.
Figure 9B:
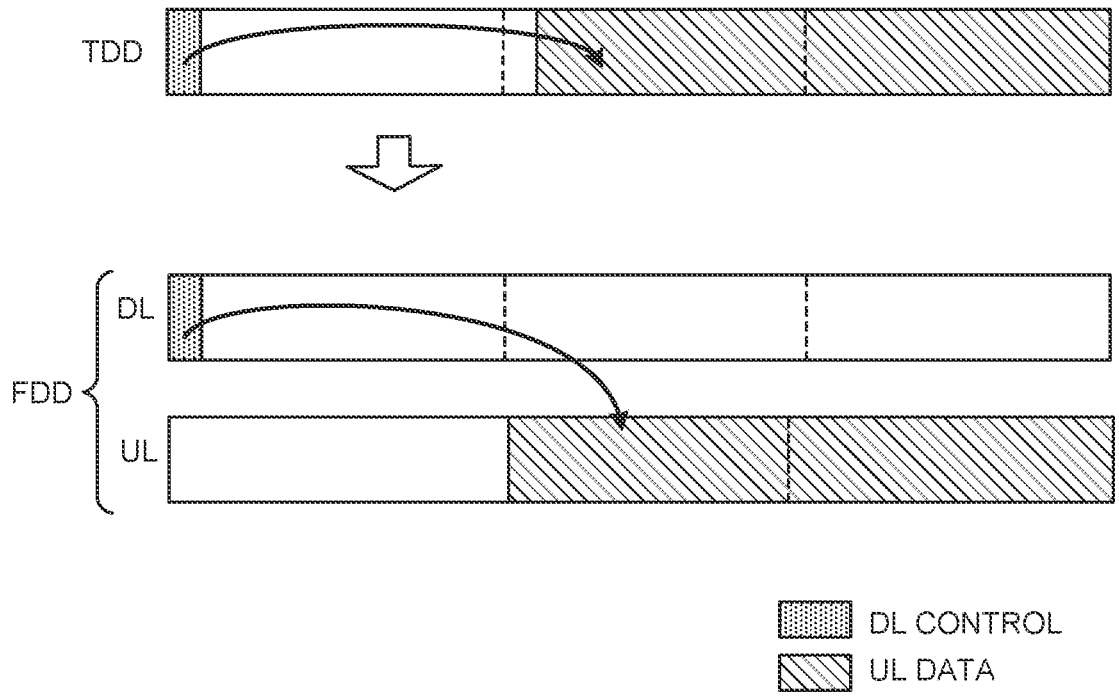

FIGS. 9A and 9B provide diagrams to show other examples of UL communication control according to the second aspect. As shown in FIGS. 9A and 9B, when FDD is used, in a given subframe, the user terminal may receive a DL control signal, which is received in a DL frequency, and based on the scheduling information contained in this DL control signal, the user terminal may transmit, by using a UL frequency, a UL data signal in at least one subframe after the subframe in which the DL control signal was contained.

For example, the user terminal may transmit a UL data signal in the next subframe of the DL control signal, as shown in FIG. 9A, or transmit UL control signals in the next two subframes of the DL control signal, as shown in FIG. 9B. When TDD is used, DL control signals for other user terminals are transmitted in a predetermined number of symbols at the top of a subframe, so UL data signals cannot be assigned here. On the other hand, in FDD, DL control signals for other user terminals are transmitted in different frequencies than UL data signals, so that it is possible to assign UL data signals at the beginning of subframes.

In FIGS. 8A, 8B, 9A, and 9B, the number of subframes (also referred to as the "TTI duration") in which UL data signals are assigned may be indicated explicitly by the DL control signal, or may be indicated implicitly based on at least one of the transport block size, the number of PRBs assigned to the UL data signals, and so on.

Also, although not shown in the drawings, a feedback signal (for example, an HARQ-ACK, etc.) in response to a UL data signal may be transmitted in the same subframe as that of the UL data signal, or may be transmitted in a subsequent subframe. Furthermore, feedback signals in response to the UL data signals in a plurality of different subframes may be multiplexed.

As described above, according to the second aspect of the present invention, even when FDD is used, UL communication (for example, transmission of UL data signals, transmission of feedback signals, etc.) is controlled in the same timing as in TDD. Therefore, even when FDD is used in future radio communication systems, it is possible to achieve the advantages of adopting dynamic subframe utilization. Also, even when the user terminal to communicate in this FDD carrier is not capable of full-duplex (which is simultaneous DL receipt and UL transmission) (that is, when the user terminal is only capable of half-duplex), dynamic subframes can be employed by applying the same control as in TDD, so that it is not necessary to apply a plurality of different kinds of scheduling control depending on the user terminal's capabilities, and it is possible to simplify the implementation of the scheduler in the base station.

(Third Aspect)

Given that, in TDD, DL communication and UL communication are switched over time in the same frequency band, and it follows that TDD is a half-duplex communication scheme, in which only one of transmission and receipt can be performed at a given time. On the other hand, in FDD, DL communication and UL communication are performed in different frequency bands, and it follows that, depending on the capabilities of the user terminal, FDD can be a full-duplex communication scheme, in which transmission and receipt can be performed at the same time.

If the user terminal can adopt the full-duplex FDD communication scheme, as has been described earlier with the first and second aspects of the present invention, when DL communication and/or UL communication are controlled in the same way as when the half-duplex TDD communication scheme is used, unused resources might increase, and the efficiency of the use of resources might decrease.

Figure 10:
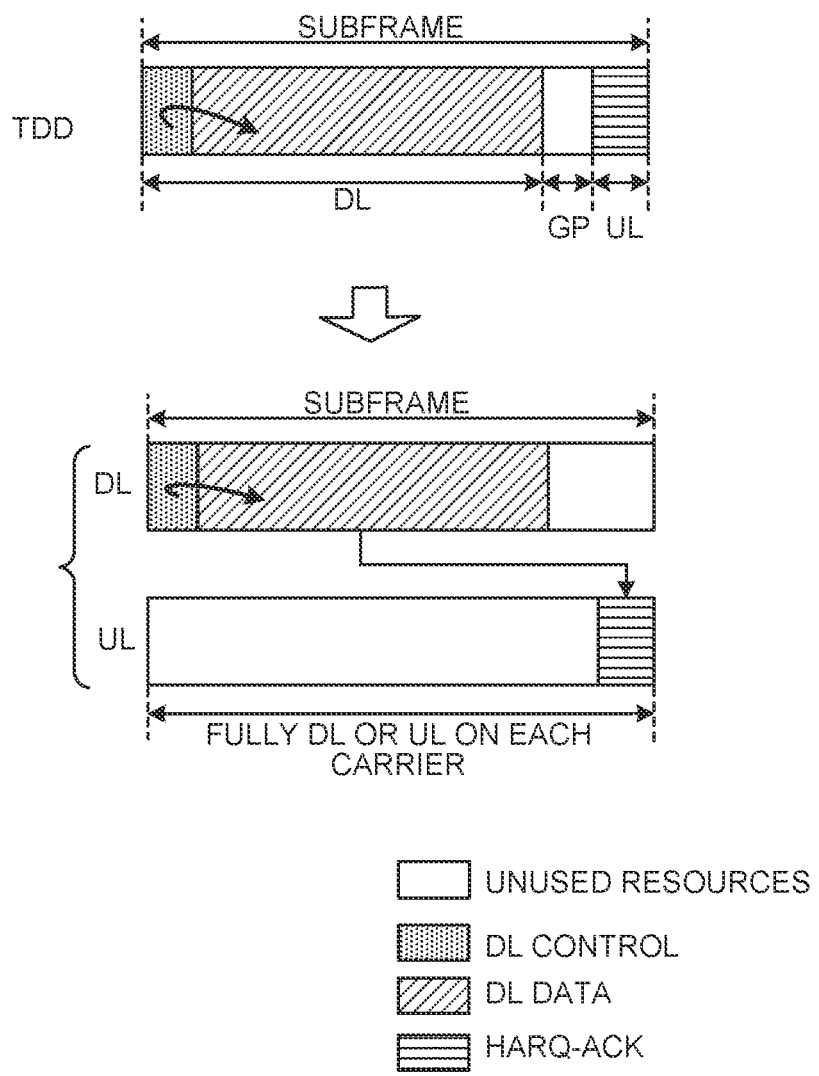
FIG. 10 is a diagram to show an example of unused resources in FDD.

FIG. 10 is a diagram to show an example of unused resources in FDD. As shown in FIG. 10, when the half-duplex TDD communication scheme is adopted, unused resources will not occur, except for the guard period (GP). On the other hand, when the full-duplex FDD communication scheme is used, in addition to the guard period, the UL frequency in the DL period in which DL signals are received and the DL frequency in the UL period in which UL signals are transmitted are not used either.

So, according to the third aspect, the UL frequency and/or DL frequency resources that are unoccupied when the full-duplex FDD communication scheme is used are also subject to scheduling. With the third aspect, the differences from the first and/or third aspects will be primarily described.

Note that, in the following description, the UL frequency that is unoccupied in FDD may be scheduled for user terminals that use the DL frequency, or may be scheduled for other user terminals. To be more specific, in the UL frequency that is unoccupied in FDD, UL data signals and/or UL sounding reference signals from user terminals that use the DL frequency and/or other user terminals may be scheduled for transmission.

Similarly, the DL frequency that is unoccupied in FDD may be scheduled for user terminals using the UL frequency, or may be scheduled for other user terminals. To be more specific, in the DL frequency that is unoccupied in FDD, DL data signals and/or DL sounding reference signals from user terminals that use the UL frequency and/or other user terminals may be scheduled for receipt.

<DL Scheduling>

Based on the DL scheduling according to the third aspect, in at least one of a DL period in which a DL data signal and a DL control signal that schedules this DL data signal are transmitted/received using the DL frequency, and a guard period in TDD, a UL data signal and/or a UL sounding reference signal (hereinafter referred to as "UL data/sounding reference signals") are transmitted and received using the UL frequency.

Furthermore, in at least one of a UL period in which a feedback signal in response to the DL data signal is transmitted and received using the UL frequency, and the above guard period, a DL data signal and/or a DL sounding reference signal (hereinafter referred to as "DL data/sounding reference signals") are transmitted and received using the DL frequency.

Figure 11A:
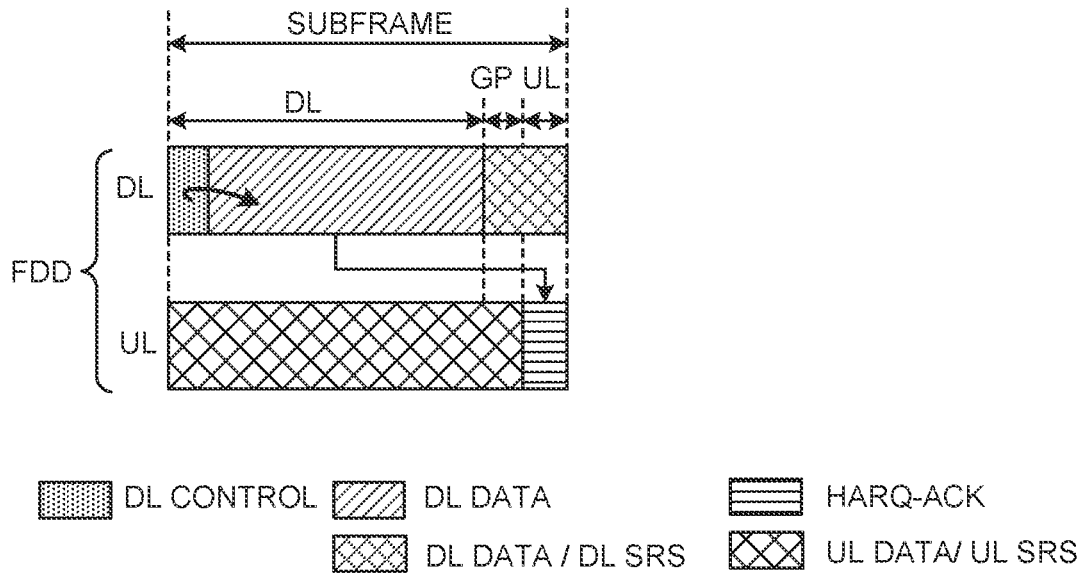
FIGS. 11A and 11B are diagrams to show examples of DL scheduling control according to a third aspect of the present invention.
Figure 11B:
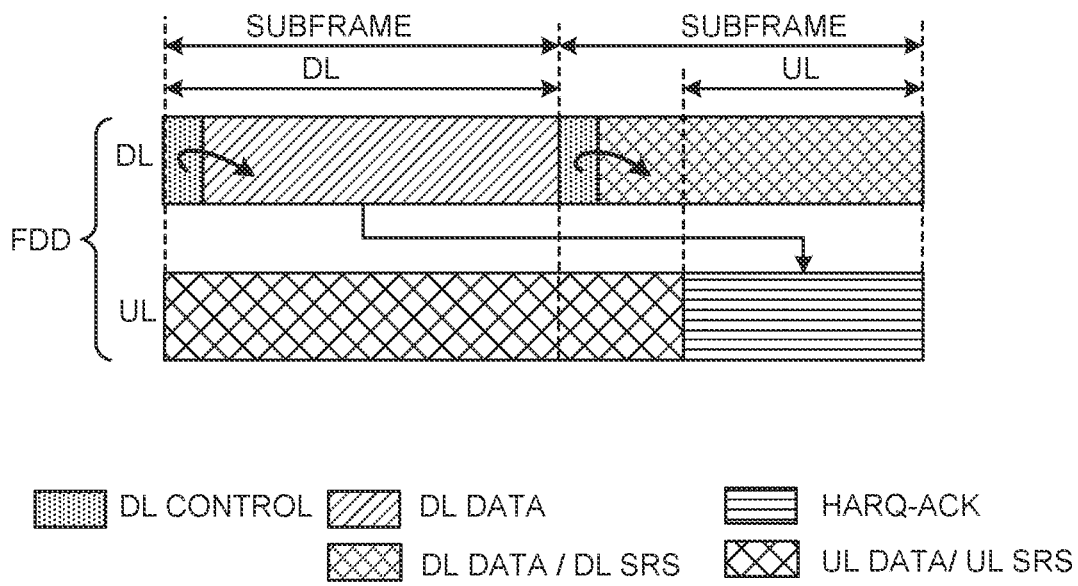

FIGS. 11A and 11B is a diagram to show an example of DL scheduling control according to the third aspect. A DL control signal and a DL data signal that is scheduled by this DL control signal may be received, and a feedback signal (for example, an HARQ-ACK) in response to this DL data signal may be transmitted, all in the same subframe, as shown in FIG. 11A, or in separate subframes, as shown in FIG. 11B.

Referring now to FIGS. 11A and 11B, in the DL period (DL) in which a DL control signal and a DL data signal are transmitted and received using the DL frequency, and in the guard period (GP) in TDD, UL data/sounding reference signals are transmitted and received using the UL frequency. The UL data/sounding reference signals may be scheduled by the DL control signal transmitted in the same subframe as that of the DL data signal or in a preceding subframe, or may be configured by higher layer signaling (resources may be configured).

Also, referring to FIGS. 11A and 11B, in the UL period (UL), in which a feedback signal is transmitted and received using the UL frequency, DL data/sounding reference signals are transmitted and received using the DL frequency. The DL data/sounding reference signals may be scheduled by the DL control signal transmitted in the same subframe as that of the DL data signal or in a preceding subframe, or may be configured by higher layer signaling (resources may be configured).

Figure 12A:
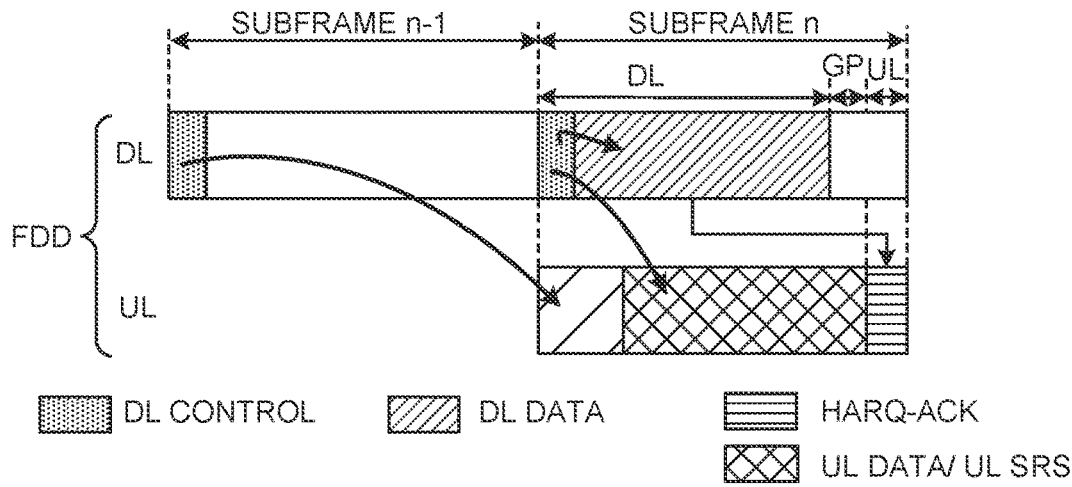
FIGS. 12A to 12C are diagrams to show detailed examples of DL scheduling control according to the third aspect.
Figure 12B:
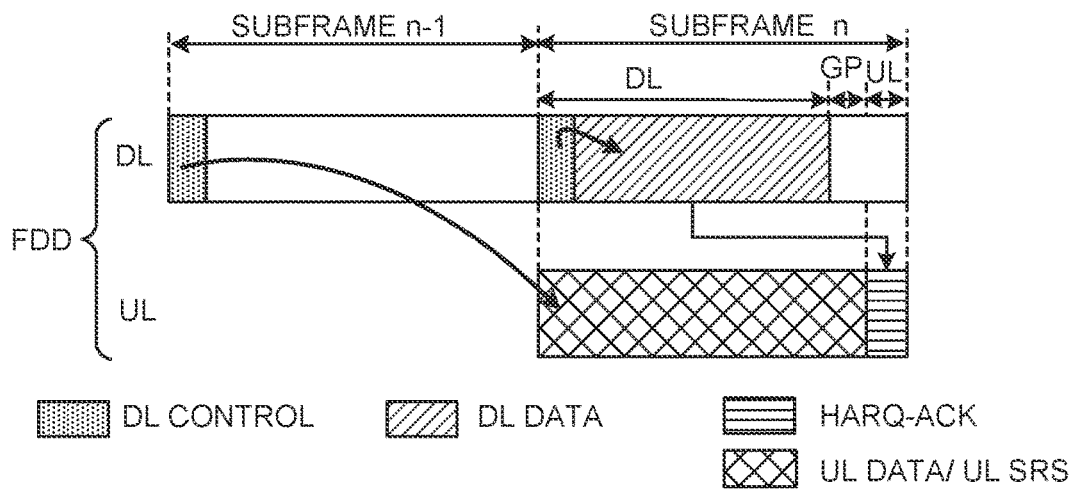
Figure 12C:
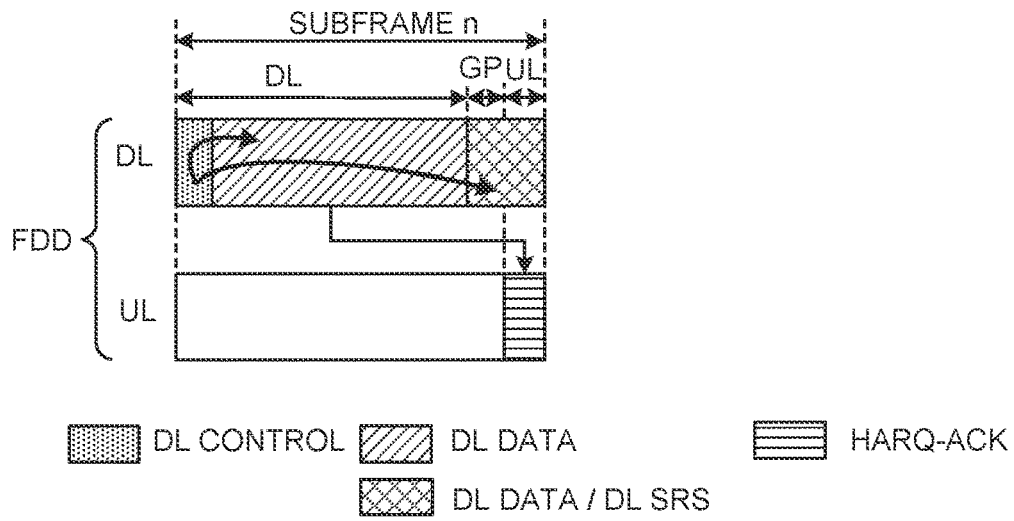

FIGS. 12A, 12B, and 12C provide diagrams to show detailed examples of DL scheduling control according to the third aspect. As shown in FIG. 12A, the UL data/sounding reference signals transmitted and received using the UL frequency in the DL period in subframe n may be scheduled by the DL control signal (for example, a UL grant) of subframe n. In this case, the user terminal needs time to receive (decode) the DL control signal, and so the UL data/sounding reference signals cannot be assigned from the beginning of subframe n.

Therefore, as shown in FIG. 12A, the UL data/sounding reference signals may be scheduled, in the time period for receiving (decoding) the DL control signal in subframe n, by the DL control signal of subframe n-1. For example, in FIG. 12A, the UL sounding reference signal may be assigned by the DL control signal of subframe n-1, and the UL data signal may be assigned by the DL control signal of subframe n.

Meanwhile, cases might occur where the time period from the receipt of a DL control signal (for example, a UL grant) in subframe n to the transmission of UL data/sounding reference signals cannot be made short enough with respect to the subframe duration. In this case, as shown in FIG. 12B, the UL data/sounding reference signals transmitted and received using the UL frequency in the DL period of subframe n may be scheduled by the DL control signal (for example, a UL grant) of subframe n-1.

Furthermore, as shown in FIG. 12C, the DL data/sounding reference signals transmitted and received using the DL frequency in the guard period and the UL period of subframe n may be scheduled by the DL control signal (for example, a UL grant) of subframe n. The scheduling information of the DL data/sounding reference signals may be included in the DL data signal-assigning DL control signal in same subframe n, or may be included in a DL control signal that is different from that DL control signal. In the former case, a new bit field may be introduced in existing DCI formats.

<UL Scheduling Control>

Based on the UL scheduling according to the third aspect, in at least one of a DL period in which a DL control signal that schedules a UL data signal is transmitted and received using the DL frequency, and a guard period in TDD, UL data/sounding reference signals are transmitted and received using the UL frequency.

Furthermore, DL data/sounding reference signals are transmitted and received using the DL frequency, in at least one of a UL period in which a UL data signal is transmitted and received using the UL frequency, and the above guard period.

Figure 13A:
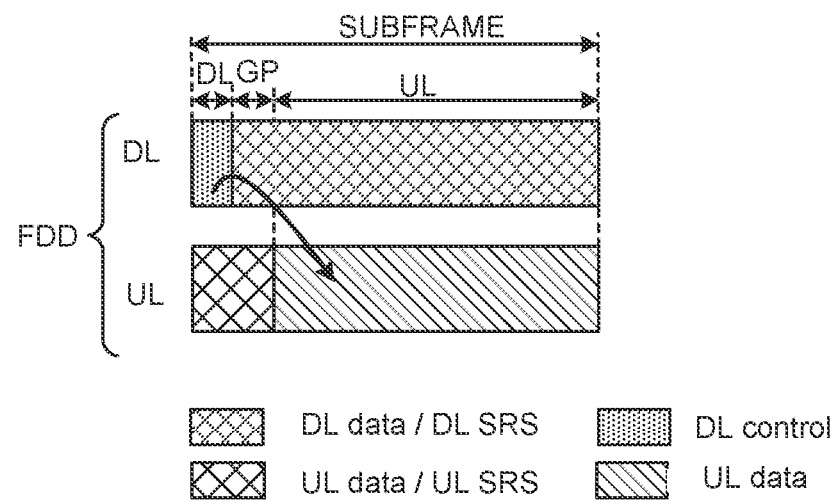
FIGS. 13A and 13B are diagrams to show examples of UL scheduling control according to the third aspect.
Figure 13B:
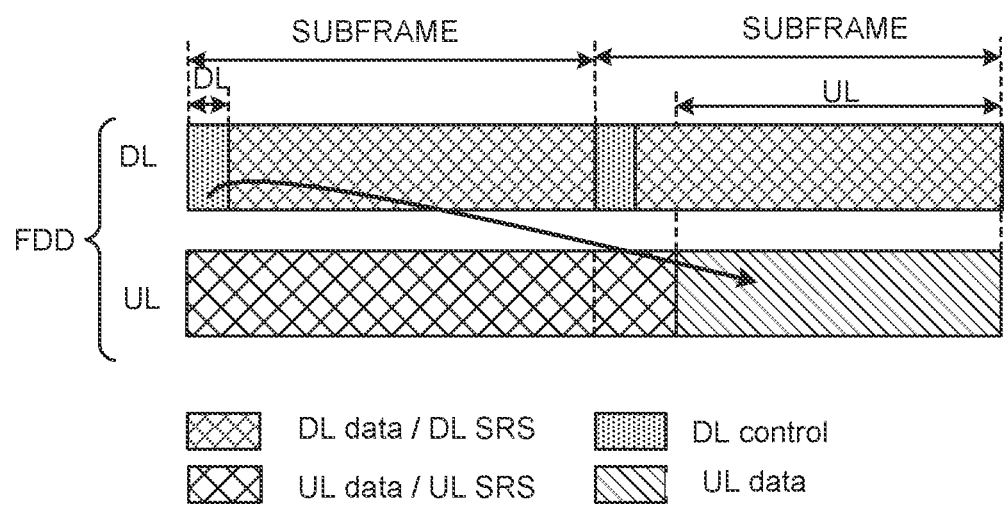

FIGS. 13A and 13B provide diagrams to show examples of UL scheduling control according to the third aspect. A DL control signal may be received, and a DL data signal that is scheduled by this DL control signal may be transmitted, all in the same subframe, as shown in FIG. 13A, or in separate subframes, as shown in FIG. 13B.

Referring to FIGS. 13A and 13B, in the DL period (DL) in which a DL control signal is transmitted and received using the DL frequency, and in the guard period (GP) in TDD, UL data/sounding reference signals are transmitted and received using the UL frequency. The UL data/sounding reference signals may be scheduled by the DL control signal transmitted in the same subframe as that of the DL data signal or in a preceding subframe, or may be configured by higher layer signaling (resources may be configured).

Also, referring to FIGS. 13A and 13B, in the UL period (UL), in which a UL data signal is transmitted and received using the UL frequency, DL data/sounding reference signals are transmitted and received using the DL frequency. The DL data/sounding reference signals may be scheduled by the DL control signal transmitted in the same subframe as that of the DL data signal or in a preceding subframe, or may be configured by higher layer signaling (resources may be configured).

Figure 14A:
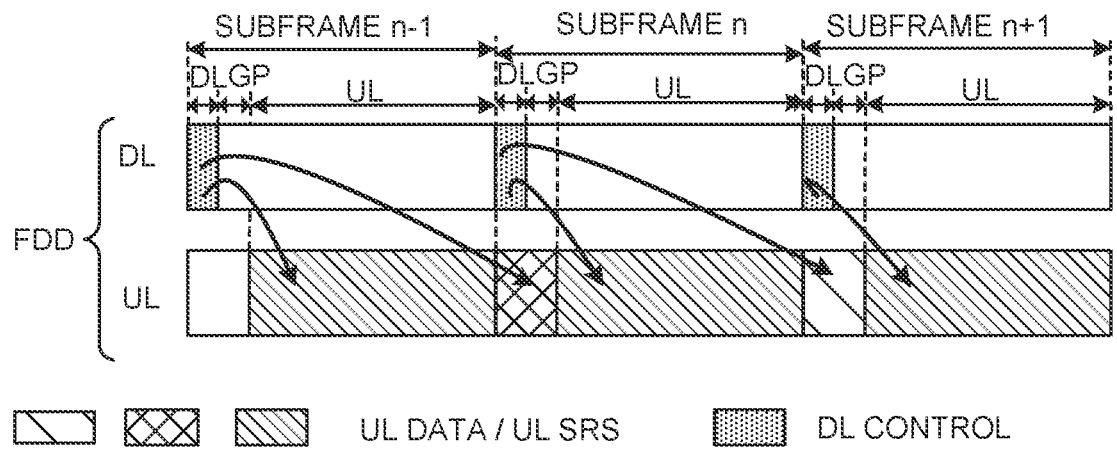
FIGS. 14A and 14B are diagrams to show detailed examples of UL scheduling control according to the third aspect.
Figure 14B:
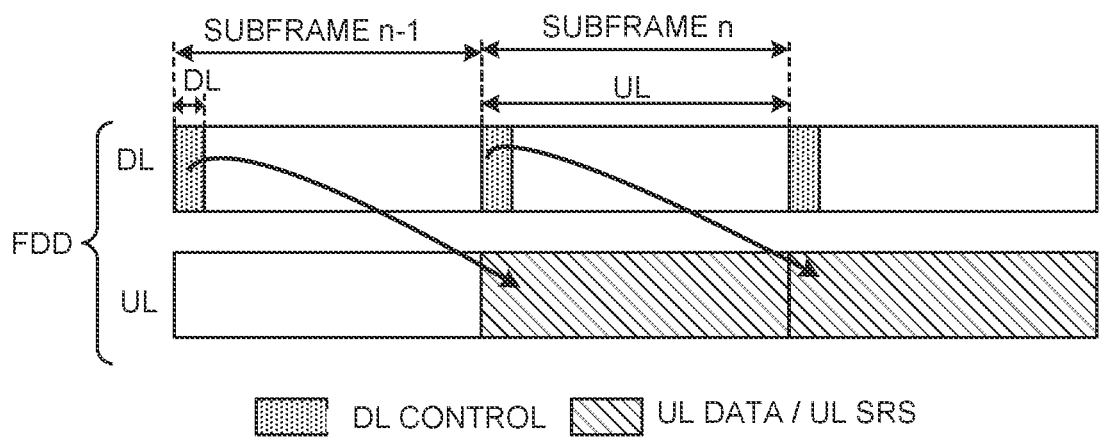

FIGS. 14A and 14B provide diagrams to show detailed examples of UL scheduling control according to the third aspect. As shown in FIG. 14A, the UL data/sounding reference signals transmitted in the UL period of each subframe may be scheduled by the DL control signal of the same subframe. In this case, since the user terminal needs time to receive (decode) the DL control signal, and therefore the UL data/sounding reference signals cannot be assigned from the beginning of subframe n.

So, as shown in FIG. 14A, the DL control signal from the previous subframe may schedule the UL data/sounding reference signals in the DL period in the next subframe and in the guard period. For example, referring to FIG. 14A, the UL sounding reference signal may be assigned by the DL control signal of subframe n-1, and the UL data signal may be assigned by the DL control signal of subframe n.

Meanwhile, cases might occur where the time period from the receipt of a DL control signal (for example, a UL grant) in each subframe to the transmission of UL data/sounding reference signals cannot be made short enough with respect to the subframe duration. In this case, as shown in FIG. 14B, the UL data/sounding reference signals in the next subframe may be scheduled by using the DL control signal (for example, a UL grant) from the previous subframe. Note that, in FIGS. 14A and 14B, the DL control signal may be transmitted in a subframe that is one or more subframes earlier.

Figure 15A:
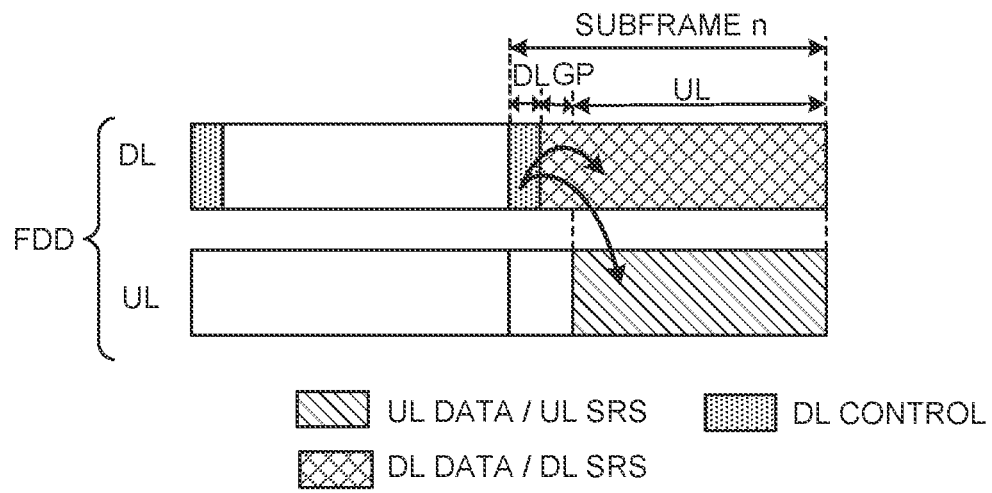
FIGS. 15A and 15B are diagrams to show other detailed examples of UL scheduling control according to the third aspect.
Figure 15B:
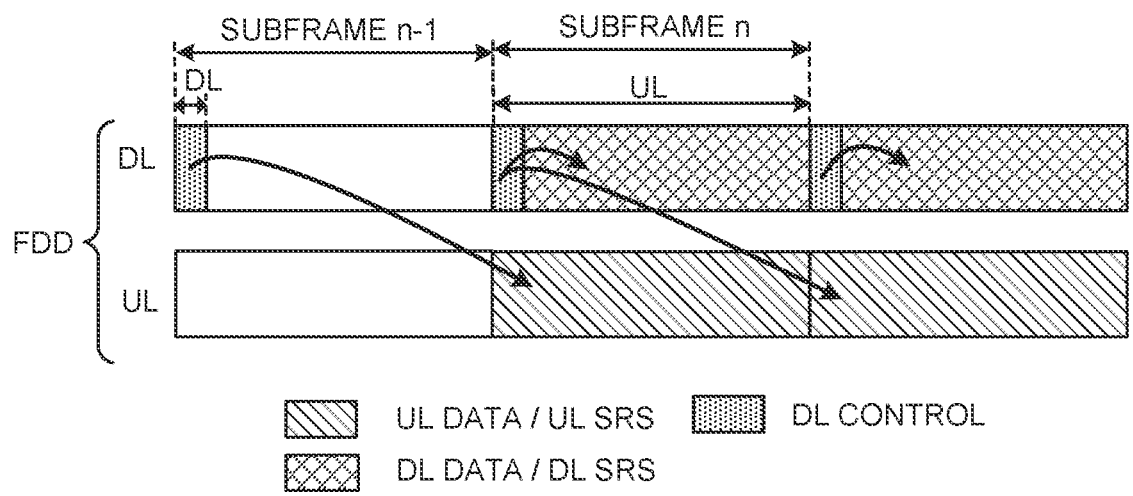

FIGS. 15A and 15B provide diagrams to show other detailed examples of UL scheduling control according to the third aspect. The UL data/sounding reference signals transmitted and received using the UL frequency in the UL period of subframe n may be scheduled by the DL control signal in the same subframe n, as shown in FIG. 15A, or scheduled by the DL control signal in previous subframe n-1, as shown in FIG. 15B.

In FIGS. 15A and 15B, in the UL period in subframe n, the DL data/sounding reference signals may be transmitted and received using the DL frequency. The DL data/sounding reference signals may be scheduled by the DL control signal (for example, a UL grant) of subframe n, as shown in FIGS. 15A and 15B.

The DL control signal may be a DL control signal for scheduling UL data/sounding signals as shown in FIG. 15A, or may be another DL control signal for scheduling DL data/sounding signals, which is different from the above DL control signal, as shown in FIG. 15B.

(Radio Communication System)

Now, the structure of a radio communication system according to an embodiment of the present invention will be described below. In this radio communication system, communication is performed using one or a combination of the radio communication methods according to the above aspects of the present invention.

Figure 16:
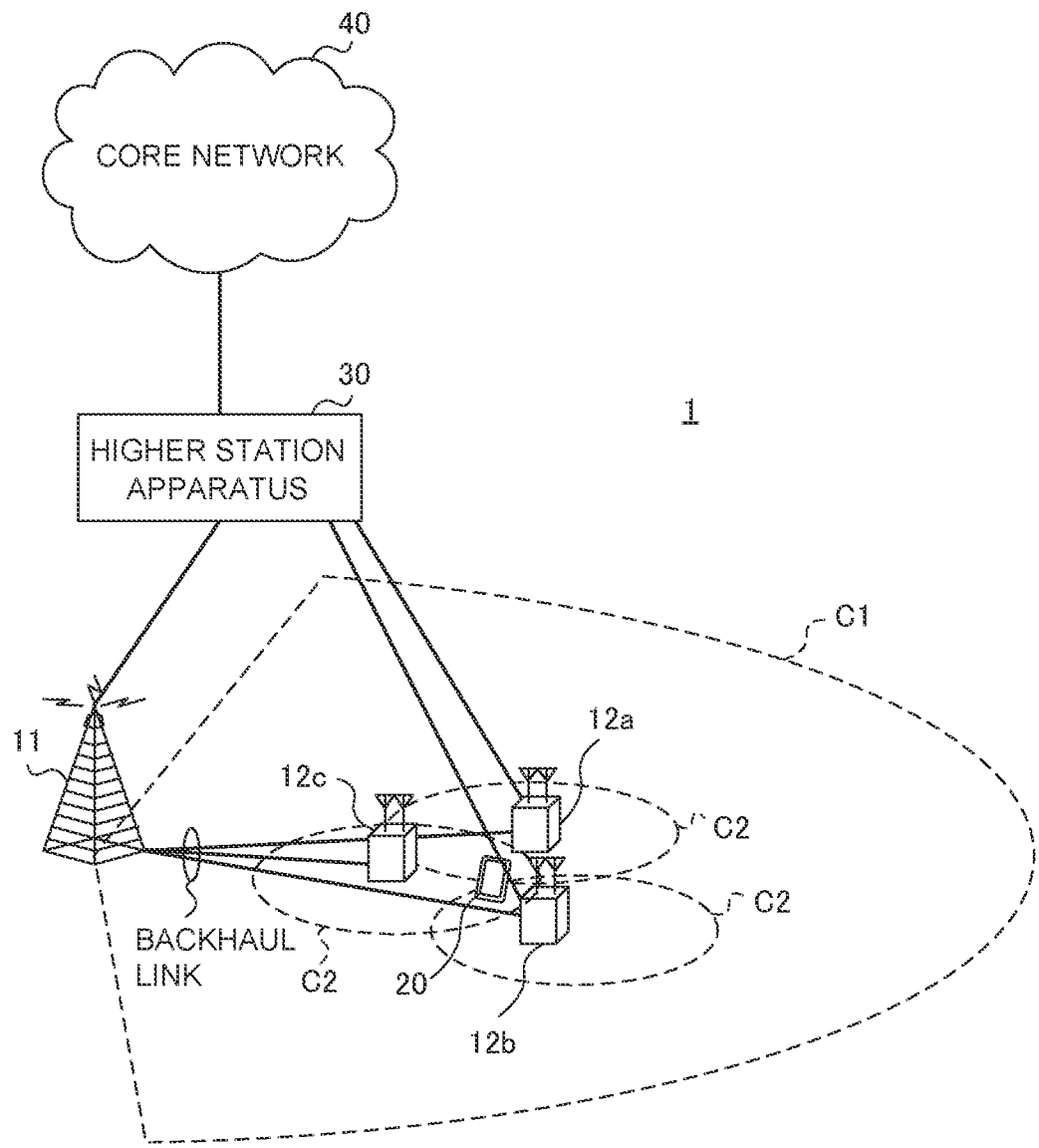
FIG. 16 is a diagram to show an example of a schematic structure of a radio communication system according to the present embodiment.

FIG. 16 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 shown in FIG. 16 includes a radio base station 11 that forms a macro cell C1 of relatively a wide coverage, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS) and so on are communicated as DL reference signals. Also, in the radio communication system 1, the measurement reference signal (SRS: Sounding Reference Signal), the demodulation reference signal (DMRS) and so on are communicated as UL reference signals. Note that the DMRS may be referred to as a "user terminal-specific reference signal (UE-specific Reference Signal)." Also, the reference signals to be communicated are by no means limited to these.

<Radio Base Station>

Figure 17:
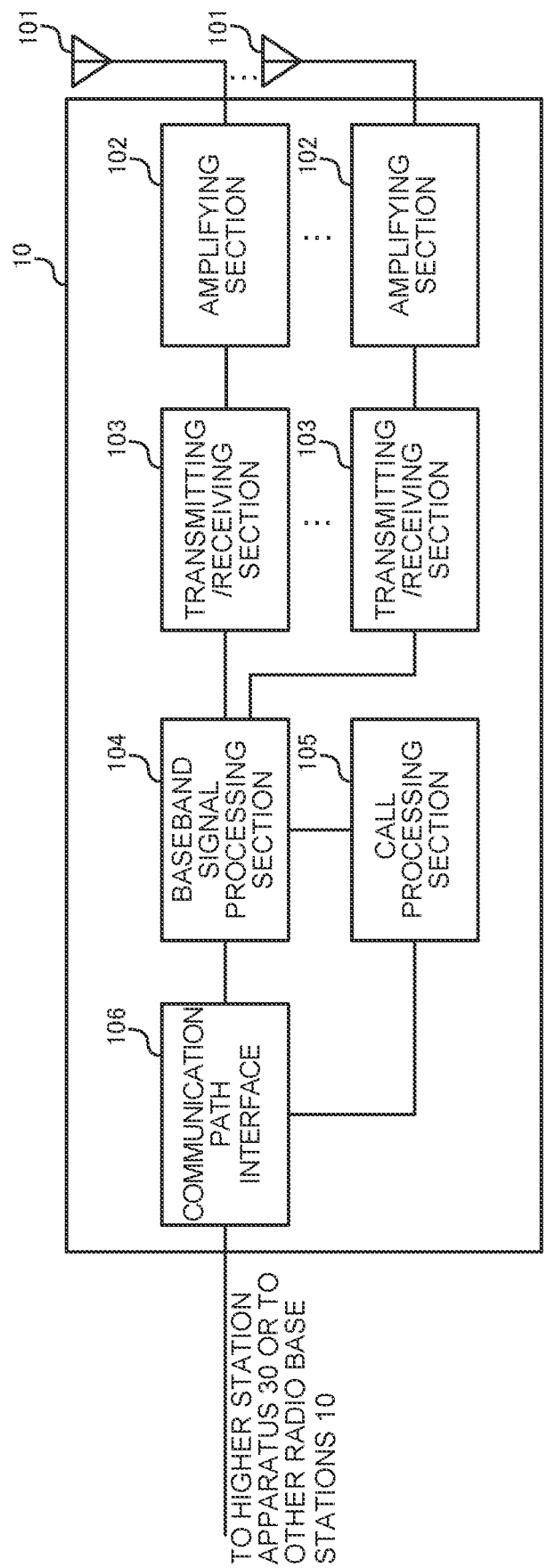
FIG. 17 is a diagram to show an example of an overall structure of a radio base station according to the present embodiment.

FIG. 17 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 through DL is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals, DL data signals, DL reference signals, discovery signals, synchronization signals, broadcast signals, etc.) and receive UL signals (for example, UL control signals, UL data signals, UL reference signals, random access preambles, etc.). To be more specific, the transmitting/receiving sections 103 transmit DL signals in DL frequencies and receive UL signals in UL frequencies.

To be more specific, following commands from the control section 301, the transmitting/receiving sections 103 carry out the transmission of DL signals (first aspect) and/or the receipt of UL signals (second aspect) in FDD, which use different frequencies, in the same timing as the transmission of DL signals and/or the receipt of UL signals in TDD, which use the same frequency.

In addition, in at least one of a DL period, in which a DL data signal and a DL control signal that schedules this DL data signal are transmitted using the DL frequency (first frequency), and a guard period in TDD, the transmitting/receiving sections 103 may receive a UL data signal and/or a UL sounding reference signal by using the UL frequency (second frequency) (third aspect).

In addition, in at least one of a UL period, in which a feedback signal in response to a DL data signal is received using the UL frequency, and a guard period in TDD, the transmitting/receiving sections 103 may transmit a DL data signal and/or a DL sounding reference signal by using the DL frequency (third aspect).

In addition, in at least one of a DL period in which a DL control signal that schedules a UL data signal is transmitted using the DL frequency, and a guard period in TDD, the transmitting/receiving sections 103 may receive a UL data signal and/or a UL sounding reference signal by using the UL frequency (third aspect).

In addition, in at least one of a UL period in which a UL data signal is received using the UL frequency, and a guard period in TDD, the transmitting/receiving sections 103 may transmit a DL data signal and/or a DL sounding reference signal by using the DL frequency (third aspect).

Figure 18:
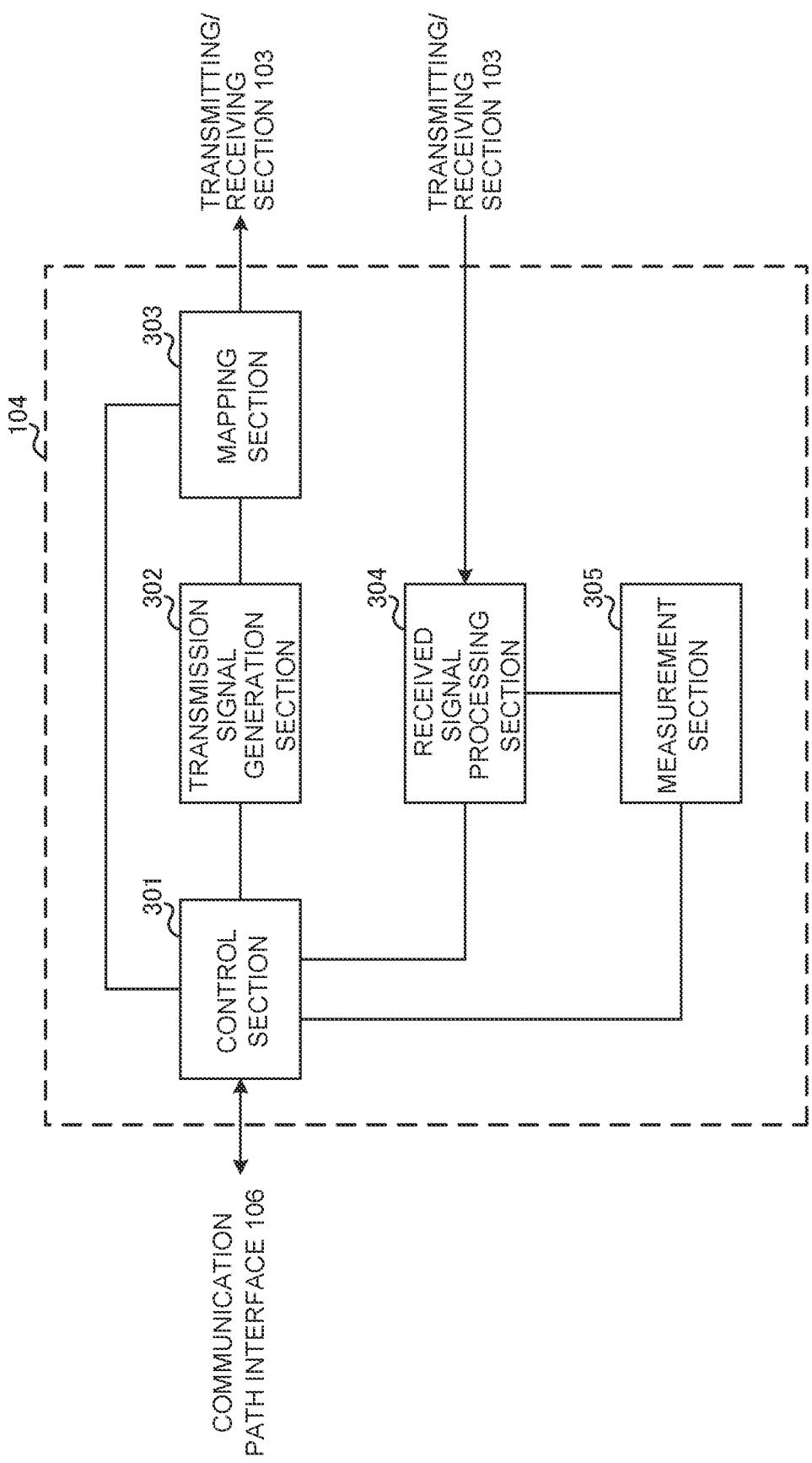
FIG. 18 is a diagram to show an example of a functional structure of a radio base station according to the present embodiment.

FIG. 18 is a diagram to show an example of a functional structure of a radio base station according to the present embodiment. Note that, although FIG. 18 primarily shows functional blocks that pertain to characteristic parts of the present embodiment, the radio base station 10 has other functional blocks that are necessary for radio communication as well. As shown in FIG. 18, the baseband signal processing section 104 at least has a control section (scheduler) 301, a transmission signal generation section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. For example, the control section 301 may schedule DL signals (for example, discovery signals, synchronization signals, broadcast signals, and so on) and/or UL signals (for example, random access preambles, and so on) that are configured in advance in fixed subframes (see FIG. 1 and FIG. 2). In addition, the control section 301 may schedule DL signals (for example, DL-SRSs, DL data signals, and so on) and/or UL signals (for example, UL-SRSs, UL data signals, and so on) in dynamic subframes (see FIG. 1 and FIG. 2).

Furthermore, the control section 301 controls the transmission of DL signals and/or the receipt of UL signals in FDD, which use different frequencies, to the same timing as the transmission of DL signals and/or the receipt of UL signals in TDD, which use the same frequency.

Also, in at least one of a DL period, in which a DL data signal and a DL control signal that schedules this DL data signal are transmitted using the DL frequency, and a guard period in TDD, the control section 301 may schedule or configure a UL data signal and/or a UL sounding reference signal, which are received by using the UL frequency, by using a DL control signal that is transmitted in the same subframe as that of the DL data signal or in a preceding subframe, or by means of higher layer signaling (third aspect, see FIGS. 11A, 11B, 12A, 12B, and 12C).

Also, in at least one of a UL period, in which a feedback signal in response to a DL data signal is received using the UL frequency, and a guard period in TDD, the control section 301 may schedule or configure a DL data signal and/or a DL sounding reference signal, which are transmitted by using the DL frequency, by using a DL control signal that is transmitted in the same subframe as that of the DL data signal or in a preceding subframe, or by means of higher layer signaling (third aspect, see FIGS. 11A, 11B, 12A, 12B, and 12C).

Also, in at least one of a DL period, in which a DL control signal that schedules a UL data signal is transmitted using the DL frequency, and a guard period in TDD, the control section 301 may schedule or configure a UL data signal and/or a UL sounding reference signal, which are received by using the UL frequency, by using a DL control signal that is transmitted in the same subframe as that of the UL data signal or in a preceding subframe, or by means of higher layer signaling, (third aspect, see FIGS. 13A, 13B, 14A, 14B, 15A, and 15B).

Furthermore, in at least one of a UL period in which a UL data signal is received using the UL frequency, and a guard period in TDD, the control section 301 may, by using a DL control signal that is transmitted in the same subframe as that of the UL data signal or in a preceding subframe, or by means of higher layer signaling, schedule or configure a DL data signal and/or a DL sounding reference signal, which are transmitted by using the DL frequency (third aspect, see FIGS. 13A, 13B, 14A, 14B, 15A, and 15B).

The transmission signal generation section 302 generates DL signals (DL control signals, DL data signals, DL reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The transmission signal generation section 302 generates DL control signals (for example, DL assignments) for reporting DL signal scheduling information, and DL control signals (for example, UL grants) for reporting UL signal scheduling information, based on commands from the control section 301, for example. Also, the DL data signals are subjected to the coding process, the modulation process and so on, by using coding rates and modulation schemes that are determined based on, for example, channel state information (CSI) from each user terminal 20.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, UL signals transmitted from the user terminals 20 (UL control signals, UL data signals, UL reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a feedback signal (for example, a HARQ-ACK) is received, this feedback signal is output to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 19:
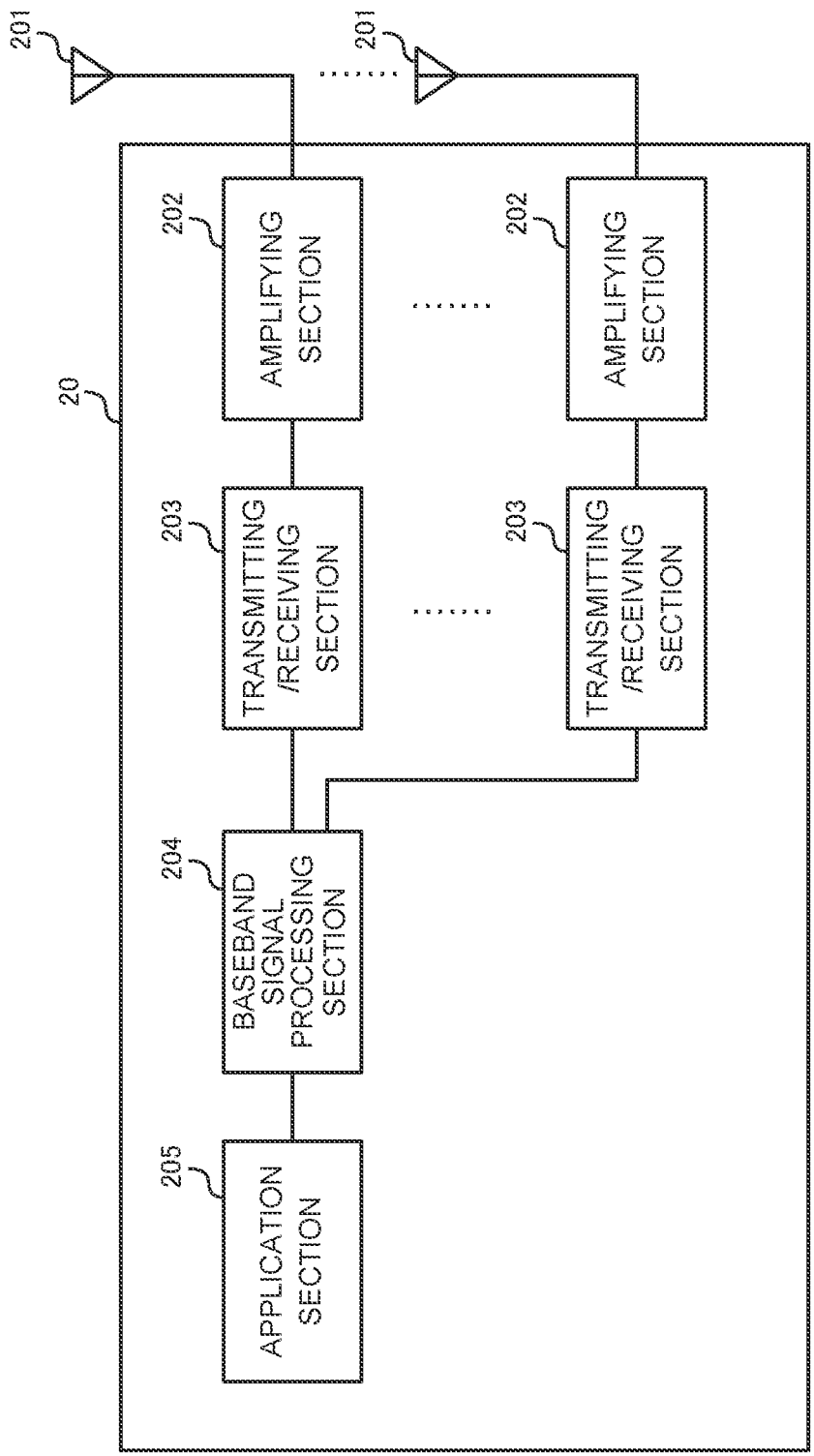
FIG. 19 is a diagram to show an example of an overall structure of a user terminal according to the present embodiment.

FIG. 19 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals, DL data signals, DL reference signals, discovery signals, synchronization signals, broadcast signals, etc.), and transmit UL signals (for example, UL control signals, UL data signals, UL reference signals, random access preambles, etc.). To be more specific, the transmitting/receiving sections 203 receive DL signals in DL frequencies and transmit UL signal in UL frequencies.

To be more specific, following commands from the control section 401, the transmitting/receiving sections 203 carry out the receipt of DL signals (first aspect) and/or the transmission of UL signals (second aspect) in FDD, which use different frequencies, in the same timing as the receipt of DL signals and/or the transmission of UL signals in TDD, which use the same frequency.

In addition, in at least one of a DL period in which a DL data signal and a DL control signal that schedules this DL data signal are transmitted using the DL frequency, and a guard period in TDD, the transmitting/receiving sections 203 may transmit a UL data signal and/or a UL sounding reference signal by using the UL frequency (third aspect).

In addition, in at least one of a UL period in which a feedback signal in response to a DL data signal is received using the UL frequency, and a guard period in TDD, the transmitting/receiving sections 203 may receive a DL data signal and/or a DL sounding reference signal by using the DL frequency (third aspect).

In addition, in at least one of a DL period, in which a DL control signal that schedules a UL data signal is transmitted using the DL frequency, and a guard period in TDD, the transmitting/receiving sections 203 may transmit a UL data signal and/or a UL sounding reference signal by using the UL frequency (third aspect).

In addition, in at least one of a UL period in which a UL data signal is received using the UL frequency, and a guard period in TDD, the transmitting/receiving sections 203 may receive a DL data signal and/or a DL sounding reference signal by using the DL frequency (third aspect).

Figure 20:
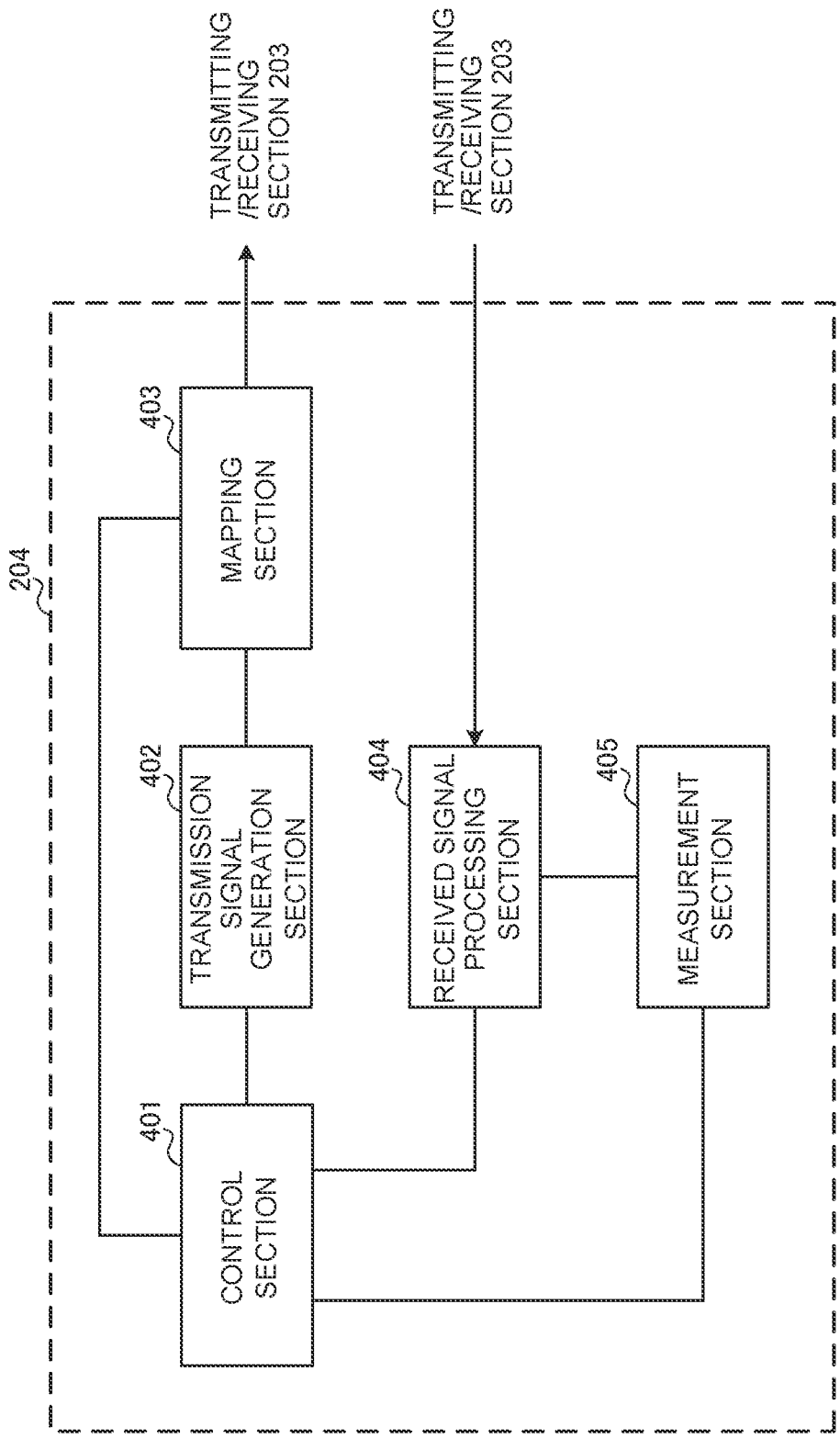
FIG. 20 is a diagram to show an example of a functional structure of a user terminal according to the present embodiment.

FIG. 20 is a diagram to show an example of a functional structure of a user terminal according to the present embodiment. Note that, although FIG. 20 primarily shows functional blocks that pertain to characteristic parts of the present embodiment, the user terminal 20 has other functional blocks that are necessary for radio communication as well. As shown in FIG. 20, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the DL control signals (signals transmitted in the PDCCH/EPDCCH) and DL data signals (signals transmitted in the PDSCH) transmitted from the radio base station 10, via the received signal processing section 404. The control section 401 controls the generation of feedback signals (for example, HARQ-ACKs and/or the like), UL data signals and so on, based on whether or not retransmission control is necessary, decided in response to the DL control signals and DL data signals, and so on.

The control section 401 controls the receipt of DL signals (for example, discovery signals, synchronization signals, broadcast signals, etc.) and/or the transmission of UL signals (for example, random access preambles), configured in advance in fixed subframes. Furthermore, the control section 401 controls the receipt of DL signals and/or the transmission of UL signals in dynamic subframes, dynamically or semi-dynamically.

Furthermore, the control section 401 controls the receipt of DL signals and/or the transmission of UL signals in FDD, which use different frequencies, to the same timing as the receipt of DL signals and/or the transmission of UL signals in TDD, which use the same frequency.

For example, the control section 401 can control the receipt of a DL data signal based on the DL control signal contained in the same subframe as that of the DL data signal (FIGS. 6A, 6B, and 6C). Furthermore, the control section 401 may control a feedback signal in TDD, which is transmitted using the FDD UL frequency, to be transmitted in the same timing as a feedback signal in TDD (FIGS. 6A, 6B, and 6C). The feedback signal may be scheduled implicitly (FIG. 7A), or may be scheduled explicitly (FIG. 7B).

Furthermore, the control section 401 may control a UL data signal, which is transmitted using the UL frequency, to be transmitted in the same timing as a UL data signal in TDD, based on a DL control signal received in the FDD DL frequency. This UL data signal may be scheduled by the DL control signal in the same subframe (FIGS. 8A and 8B), or may be scheduled by the DL control signal in a preceding subframe (FIGS. 9A and 9B).

Also, in at least one of a DL period, in which a data signal and a DL control signal that schedules this DL data signal are transmitted using the DL frequency, and a guard period in TDD, the control section 401 may control the transmission of a UL data signal and/or a UL sounding reference signal, which uses the UL frequency, based on a DL control signal that is transmitted in the same subframe as that of the DL data signal or in a preceding subframe, or based on higher layer signaling (third aspect, see FIGS. 11A, 11B, 12A, 12B, and 12C).

Also, in at least one of a UL period in which a feedback signal in response to a DL data signal is received using the UL frequency, and a guard period in TDD, the control section 401 may control the receipt of a DL data signal and/or a DL sounding reference signal, which uses the DL frequency, based on a DL control signal that is transmitted in the same subframe as that of the DL data signal or in a preceding subframe, or based on higher layer signaling (third aspect, see FIGS. 11A, 11B, 12A, 12B, and 12C).

Also, in at least one of a DL period, in which a DL control signal that schedules a UL data signal is transmitted using the DL frequency, and a guard period in TDD, the control section 401 may control the transmission of a UL data signal and/or a UL sounding reference signal, which uses the UL frequency, based on the DL control signal transmitted in the same subframe as that of the UL data signal or in a preceding subframe, or based on higher layer signaling (third aspect, see FIGS. 13A, 13B, 14A, 14B, 15A, and 15B).

Furthermore, in at least one of a UL period in which a UL data signal is received using the UL frequency, and a guard period in TDD, the control section 401 may control the receipt of a DL data signal and/or a DL sounding reference signal, which uses the DL frequency, based on a DL control signal that is transmitted in the same subframe as that of the UL data signal or in a preceding subframe, or based on higher layer signaling (third aspect, see FIGS. 13A, 13B, 14A, 14B, 15A, and 15B).

The transmission signal generation section 402 generates UL signals (UL control signals, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates UL control signals related to delivery acknowledgement information, channel state information (CSI) and so on, based on commands from the control section 401. Also, the transmission signal generation section 402 generates UL data signals based on commands from the control section 401. For example, when a UL grant is contained in a DL control signal that is reported from the radio base station 10, the control section 401 commands the transmission signal generation section 402 to generate a UL data signal.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals (DL control signals, DL data signals, DL reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 blind-decodes the DL control signals (DCI format) that schedules transmission and/or receipt of data (TBs: Transport Blocks), based on commands from the control section 401. For example, the received signal processing section 404 may be configured to blind-decode different radio resources based on whether or not the subframes are self-contained subframes.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ), the channel states and so on of the received signals. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 21:
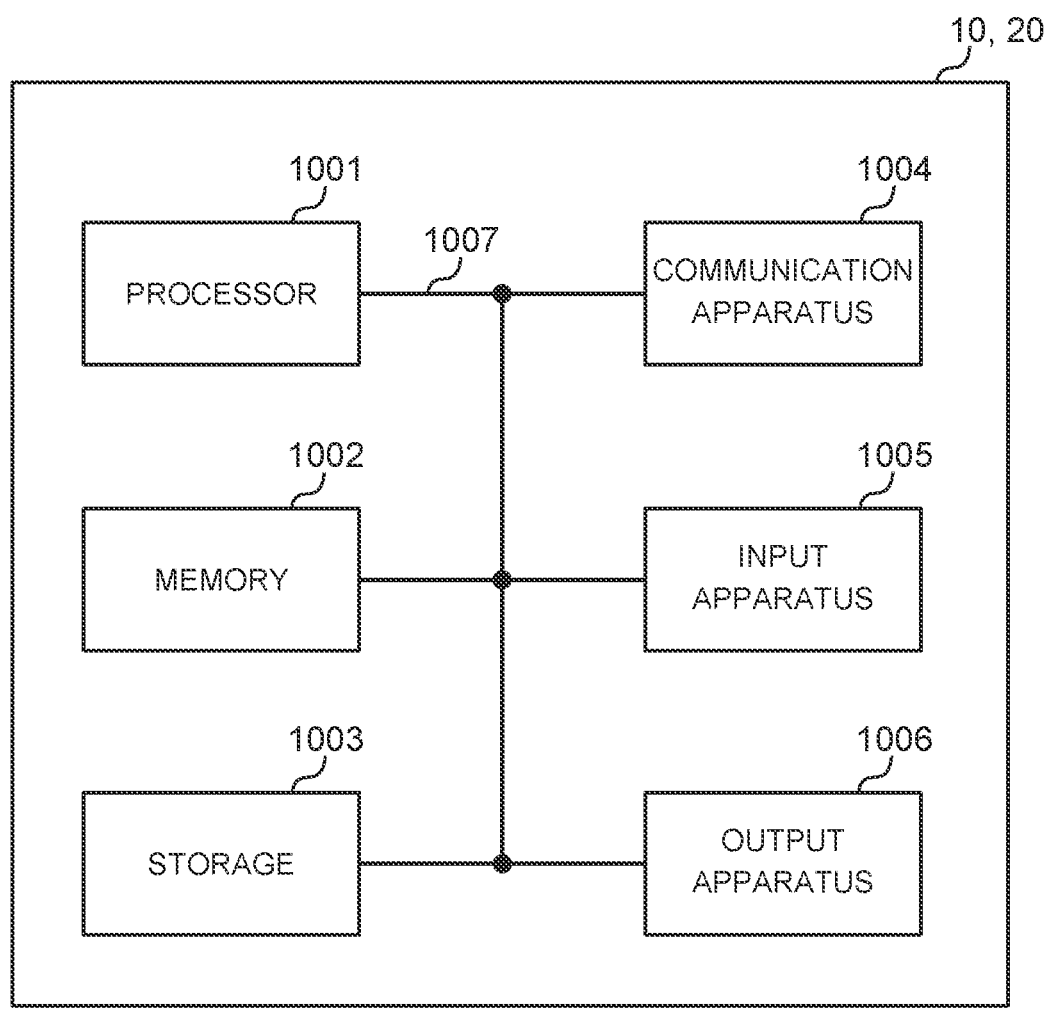
FIG. 21 is a diagram to show an example of a hardware structure of a radio base station and a user terminal according to the present embodiment.

That is, a radio base station, a user terminal and so on according to an embodiment of the present invention may function as a computer that executes the processes of the radio communication method of the present invention. FIG. 21 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules and the like for implementing the radio communication methods according to present embodiment.

The storage 1003 is a computer-readable recording medium, and is configured with at least one of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time duration of one ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The aspects/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the aspects/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideB and), Bluetooth (registered trademark), systems that use other adequate systems and/or next-generation systems that are enhanced based on these.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a processor that, in case where frequency division duplex (FDD) is applied, controls a transmission of an uplink (UL) signal, in FDD, at a same timing as a UL transmission timing that is applied in time division duplex (TDD);
a receiver that receives a downlink control information (DCI), and a physical downlink shared channel (PDSCH) scheduled by the DCI; and
a transmitter that transmits a HARQ-ACK in response to the PDSCH,
wherein the reception of the DCI and the transmission of the HARQ-ACK are allowed within one slot.

2. The terminal according to claim 1,
wherein the receiver receives a downlink (DL) signal, and
wherein the processor, when full duplex transmission is applied, performs a control to transmit the UL signal even if a time section for transmitting the UL signal overlaps a time section for receiving the DL signal.

3. A radio communication method for a terminal comprising:
controlling, where frequency division duplex (FDD) is applied, a transmission of an uplink (UL) signal, in FDD, at a same timing as a UL transmission timing that is applied in time division duplex (TDD);
receiving a downlink control information (DCI), and a physical downlink shared channel (PDSCH) scheduled by the DCI; and
transmitting a HARQ-ACK in response to the PDSCH,
wherein the reception of the DCI and the transmission of the HARQ-ACK are allowed within one slot.

4. A base station comprising:
a receiver that, in case where frequency division duplex (FDD) is applied, receives an uplink (UL) signal, in FDD, controlled at a same timing as a UL transmission timing that is applied in time division duplex (TDD);
a transmitter that transmits a downlink control information (DCI), and a physical downlink shared channel (PDSCH) scheduled by the DCI; and
a processor that controls a reception of a HARQ-ACK in response to the PDSCH,
wherein the transmission of the DCI and the reception of the HARQ-ACK are allowed within one slot.

5. A system comprising a terminal and a base station, wherein:
the terminal comprises:
a processor that, in case where frequency division duplex (FDD) is applied, controls a transmission of an uplink (UL) signal, in FDD, at a same timing as a UL transmission timing that is applied in time division duplex (TDD);
a receiver that receives a downlink control information (DCI), and a physical downlink shared channel (PDSCH) scheduled by the DCI; and
a transmitter that transmits a HARQ-ACK in response to the PDSCH,
wherein the reception of the DCI and the transmission of the HARQ-ACK are allowed within one slot, and
the base station comprises:
a receiver that receives the UL signal and the HARQ-ACK.

* * * * *